(12) United States Patent
Kon et al.

(10) Patent No.: US 8,812,559 B2
(45) Date of Patent: Aug. 19, 2014

(54) METHODS AND SYSTEMS FOR CREATING AN ADVERTISING DATABASE

(71) Applicant: SEMMX, Inc., Wilmington, DE (US)

(72) Inventors: Henry B. Kon, Lexington, MA (US); George W. Burch, Princeville, HI (US)

(73) Assignee: SEMMX, Inc., Wilmington, DE (US)

( * ) Notice: Subject to any disclaimer, the term of this patent is extended or adjusted under 35 U.S.C. 154(b) by 0 days.

(21) Appl. No.: 13/706,138

(22) Filed: Dec. 5, 2012

(65) Prior Publication Data

US 2013/0097021 A1 Apr. 18, 2013

Related U.S. Application Data

(63) Continuation of application No. 13/108,569, filed on May 16, 2011, now Pat. No. 8,554,775, which is a continuation-in-part of application No. 12/780,305, filed on May 14, 2010, now Pat. No. 7,958,153, which is a continuation of application No. 11/707,394, filed on Feb. 16, 2007, now Pat. No. 7,720,799, which is a continuation of application No. 09/548,796, filed on Apr. 13, 2000, now Pat. No. 7,275,061.

(60) Provisional application No. 60/129,103, filed on Apr. 13, 1999, provisional application No. 61/334,774, filed on May 14, 2010.

(51) Int. Cl.
*G06F 17/30* (2006.01)

(52) U.S. Cl.
USPC ........................................ 707/803

(58) Field of Classification Search
USPC ........................................ 707/803
See application file for complete search history.

(56) References Cited

U.S. PATENT DOCUMENTS

| | | | |
|---|---|---|---|
| 5,463,773 | A | 10/1995 | Sakakibara et al. |
| 5,568,640 | A | 10/1996 | Nishiyama et al. |
| 5,778,363 | A | 7/1998 | Light |
| 5,812,995 | A | 9/1998 | Sasaki et al. |
| 5,953,965 | A | 9/1999 | Kaneyama et al. |
| 6,128,613 | A | 10/2000 | Wong et al. |
| 6,185,550 | B1 | 2/2001 | Snow et al. |
| 6,363,375 | B1 | 3/2002 | Hoshino et al. |
| 6,611,840 | B1 | 8/2003 | Baer et al. |
| 7,685,191 | B1 | 3/2010 | Zwicky et al. |

(Continued)

OTHER PUBLICATIONS

Chang et al. Customizable multi-engine search tool with clustering. *Computer Networks and ISDN Systems* 29, 1217-1224 (Sep. 1, 1997).

(Continued)

*Primary Examiner* — Hung Q Pham
(74) *Attorney, Agent, or Firm* — Ropes & Gray LLP

(57) ABSTRACT

Systems and methods for applications of orthogonal corpus indexing (OCI), such as selecting ad words for purchase and improving visibility of web pages in search engines, are described. In one aspect, the systems and methods described herein employ OCI for creating an advertising database. The described systems and methods process an information database using orthogonal corpus indexing and a seed topic to derive keywords. The described systems and methods query a search engine with a first keyword of the keywords, and process the provided results page to determine content relating to a classification such as an advertiser, an advertisement, an ad word, and an advertising link page. The described systems and methods insert the determined content with respective classification in the advertising database.

20 Claims, 18 Drawing Sheets

(56) References Cited

U.S. PATENT DOCUMENTS

| | | | |
|---|---|---|---|
| 2002/0038308 A1 | 3/2002 | Cappi | |
| 2002/0052913 A1* | 5/2002 | Yamada et al. | 709/202 |
| 2007/0244755 A1* | 10/2007 | Do | 705/14 |
| 2008/0189153 A1* | 8/2008 | Haldeman | 705/7 |
| 2009/0299998 A1* | 12/2009 | Kim | 707/5 |
| 2010/0094673 A1 | 4/2010 | Lobo et al. | |
| 2010/0161406 A1 | 6/2010 | Narayan Vedam | |
| 2010/0306049 A1* | 12/2010 | Kakade et al. | 705/14.49 |
| 2011/0270678 A1 | 11/2011 | Drummond et al. | |

OTHER PUBLICATIONS

O'Kane, K. Generating hierarchical document indices from common denominators in large document collections. *Information Processing and Management* 32, 105-115 (1996).

Sahami, M. et al. SONIA: a service for organizing networked information autonomously. *Proc. of Digital Libraries*: Third ACM Conference on Digital Libraries, Pittsburgh, PA 200-209 (Jun. 23-26, 1998).

Chen, H. et al. Internet Categorization and Search: A Self-Organizing Approach. *J. Visual Communication and Image Representation* 7, 88-102 (Mar. 1, 1996).

\* cited by examiner

Home > Reference >
E - Encyclopedias (General)

| | | | |
|---|---|---|---|
| Omne bonum: a fourteenth-century encyclopedia of universal knowledge : British Library MSS Royal 6 E VI-6 E VII | 1996 | AE2.L463 S26 | H. Miller Publishers |
| Academic American encyclopedia | 1998 | AE5.A23 | Grolier Inc. |
| Encyclopedia Britannica | 1997 | AE5.B | Routledge |
| Cambridge paperback encyclopedia | 1995 | AE5.C36 | Cambridge University Press |
| Cambridge paperback encyclopedia | 1993 | AE5.C36 | Cambridge University Press |
| Collier's encyclopedia with bibliography and index | 1997 | AE5.C683 | Colliers |
| Encyclopedia Americana | 1999 | AE5.E333 | Grolier Incorporated |
| Encyclopedia of knowledge | 1991 | AE5.E478 | Grolier |
| Family encyclopedia | 1997 | AE5.F36 | Oxford University Press |
| Funk & Wagnalls new encyclopedia | 1996 | AE5.F83 | Funk & Wagnalls |
| Macmillan compact encyclopedia | 1991 | AE5.M24 | Macmillan |
| Merit students encyclopedia | 1993 | AE5.M38 | Macmillan Educational Co. |
| New standard encyclopedia | 1998 | AE5.N64 | Ferguson Pub. Co. |
| Oxford illustrated encyclopedia | 1993 | AE5.O94 | Oxford University Press |
| Webster's family encyclopedia. | 1992 | AE5.W35 | Merriam-Webster, Inc. |
| World Book encyclopedia. | 1999 | AE5.W55 | World Book |
| World Book encyclopedia of people and places. | 1998 | AE5.W563 | World Book |

KW Buyer Data (Not Normalized) — 1500

| TOPIC ID (1502) | AD PLACEMENT (1504) | TOPIC TITLE (1506) | STEM (1508) | KEYWORD (1510) | ADVERTISER LANDING PAGE (1512) | (1514) | ADDRESS | CITY | STATE | COUNTRY | POSTAL CODE | PHONE |
|---|---|---|---|---|---|---|---|---|---|---|---|---|
| 11442380 | 3 | Digital Camera | camera | cameras | Amazon.com/Cameras | Amazon.com, Inc | PO BOX 81226 | Seattle | WA | USA | 98108-1300 | +1 206 266 4064 |
| 11443806 | 3 | Photography | camera | cameras | Amazon.com/Canon-Cameras | Amazon.com, Inc | PO BOX 81226 | Seattle | WA | USA | 98108-1300 | +1 206 266 4064 |
| 17248668 | 3 | Digital Camera | camera | cameras | Amazon.com/Canon-Cameras | Amazon.com, Inc | PO BOX 81226 | Seattle | WA | USA | 98108-1300 | +1 206 266 4064 |
| 17250269 | 3 | Matrix Metering | camera | cameras | Amazon.com/Canon-Cameras | Amazon.com, Inc | PO BOX 81226 | Seattle | WA | USA | 98108-1300 | +1 206 266 4064 |
| 11442380 | 5 | Digital Camera | camera | camera's | Amazon.com/Cameras | Amazon.com, Inc | PO BOX 81226 | Seattle | WA | USA | 98108-1300 | +1 206 266 4064 |
| 15896482 | 5 | Digital Camera | camera | camera | Amazon.com/Cameras | Amazon.com, Inc | PO BOX 81226 | Seattle | WA | USA | 98108-1300 | +1 206 266 4064 |
| 17135887 | 5 | Digital Camera | camera | camera | Amazon.com/Cameras | Amazon.com, Inc | PO BOX 81226 | Seattle | WA | USA | 98108-1300 | +1 206 266 4064 |
| 11443806 | 6 | Photography | camera | camera | Amazon.com/Cameras | Amazon.com, Inc | PO BOX 81226 | Seattle | WA | USA | 98108-1300 | +1 206 266 4064 |
| 11443806 | 6 | Photography | camera | camera's | Amazon.com/Cameras | Amazon.com, Inc | PO BOX 81226 | Seattle | WA | USA | 98108-1300 | +1 206 266 4064 |
| 15896482 | 6 | Digital Camera | camera | camera's | Amazon.com/Cameras | Amazon.com, Inc | PO BOX 81226 | Seattle | WA | USA | 98108-1300 | +1 206 266 4064 |
| 11442380 | 8 | Digital Camera | camera | camera | BestBuy.com | BBY Solutions, Inc. | 7601 Penn Avenue South | Richfield | MN | USA | 55423 | +1 612 291 1000 |
| 11443806 | 8 | Photography | camera | camera | BestBuy.com | BBY Solutions, Inc. | 7601 Penn Avenue South | Richfield | MN | USA | 55423 | +1 612 291 1000 |
| 15896482 | 8 | Digital Camera | camera | camera | BestBuy.com | BBY Solutions, Inc. | 7601 Penn Avenue South | Richfield | MN | USA | 55423 | +1 612 291 1000 |
| 17135887 | 8 | Digital Camera | camera | camera | BestBuy.com | BBY Solutions, Inc. | 7601 Penn Avenue South | Richfield | MN | USA | 55423 | +1 612 291 1000 |
| 11442380 | 9 | Digital Camera | camera | cameras | BestBuy.com | BBY Solutions, Inc. | 7601 Penn Avenue South | Richfield | MN | USA | 55423 | +1 612 291 1000 |
| 11443806 | 9 | Photography | camera | cameras | BestBuy.com | BBY Solutions, Inc. | 7601 Penn Avenue South | Richfield | MN | USA | 55423 | +1 612 291 1000 |
| 17250269 | 9 | Matrix Metering | camera | cameras | BestBuy.com | BBY Solutions, Inc. | 7601 Penn Avenue South | Richfield | MN | USA | 55423 | +1 612 291 1000 |
| 11443806 | 9 | Photography | camera | camera's | BestBuy.com | BBY Solutions, Inc. | 7601 Penn Avenue South | Richfield | MN | USA | 55423 | +1 612 291 1000 |
| 15896482 | 8 | Digital Camera | camera | camera's | BestBuy.com | BBY Solutions, Inc. | 7601 Penn Avenue South | Richfield | MN | USA | 55423 | +1 612 291 1000 |
| 17248668 | 9 | Digital Camera | camera | cameras | BestBuy.com | BBY Solutions, Inc. | 7601 Penn Avenue South | Richfield | MN | USA | 55423 | +1 612 291 1000 |

METHODS AND SYSTEMS FOR CREATING AN ADVERTISING DATABASE

CROSS-REFERENCE TO RELATED APPLICATIONS

This application is a continuation of U.S. patent application Ser. No. 13/108,569, filed May 16, 2011, entitled "Orthogonal corpus index for ad buying and search engine optimization" and naming Henry B. Kon and George W. Burch as inventors, which claims priority to U.S. Provisional Application Ser. No. 61/334,774 filed on May 14, 2010, entitled "Orthogonal corpus index for ad buying and search engine optimization" and naming Henry B. Kon and George W. Burch as inventors, and is a continuation-in-part of U.S. patent application Ser. No. 12/780,305 filed May 14, 2010, now U.S. Pat. No. 7,958,153, entitled "Systems and methods for employing an orthogonal corpus for documenting indexing" and naming Henry B. Kon and George W. Burch as inventors, which is a continuation of U.S. patent application Ser. No. 11/707,394 filed Feb. 16, 2007, now U.S. Pat. No. 7,720,799, entitled "Systems and methods for employing an orthogonal corpus for documenting indexing" and naming Henry B. Kon and George W. Burch as inventors, which is a continuation of U.S. patent application Ser. No. 09/548,796 filed Apr. 13, 2000, now U.S. Pat. No. 7,275,061, entitled "Systems and methods for employing an orthogonal corpus for documenting indexing" and naming Henry B. Kon and George W. Burch as inventors, which claims priority to U.S. Provisional Application Ser. No. 60/129,103 filed Apr. 13, 1999, entitled "Systems and methods for employing an orthogonal corpus for document indexing" and naming Henry B. Kon and George W. Burch as inventors, the contents of all of which are hereby incorporated by reference in their entirety.

BACKGROUND

Tens of billions of dollars are spent annually on keyword advertising. Ad words are priced according to their demand by advertisers. General and commonly-used ad phrases such as 'Camera' cost more than related terms such as 'Lens' or 'Pixel' or 'Matrix Metering'. These less common terms may actually be a more effective triangulation into a new or better demographic with more or cheaper ad click-through rates. However, it is sometimes difficult to identify relevant related terms, and even more difficult to quantitatively assess in advance the cost effectiveness of advertisements based on these terms. The task of keyword selection and optimization is not a trivial one and a managed campaign around automatically derived ad words is a subject of this disclosure.

Another subject of this disclosure is the task of choosing content for a web page in order to improve its visibility in search engines. Visitors to a web page, and subsequent revenues from such visitors, are often determined by the web page's rank in a search engine. Building web pages with a higher position (closer to the top of a search result page) is sometimes referred to as SEO (Search Engine Optimization). Such optimization of a web page may involve editing and/or adding relevant content to attract the targeted audience. However, obtaining such content and deciding whether to add the content to the web page is a formidable task, in so much that SEO is an industry in itself. The added content needs to be readily comprehensible as well as relevant to visitors to the web page. There remains a need for systems and methods for determining such relevant content to add to a web page and improve its visibility in search engine results.

SUMMARY

Marketers purchase ad words for virtually any device or service imaginable. In one aspect, the systems and methods described herein employ orthogonal corpus indexing (OCI) to select ad words for purchase. Advertisers pay search engines for placement of their advertising along side results in the search results page, when a given word or phrase appears in a user's search query. Such words or phrases are sometimes referred to as ad words. The systems and methods described herein, inter alia, enable automated selection of related and discriminating terms, identifying keywords that increase the ratio of ads clicked-through to money spent on keyword buying. This may be accomplished with the aid of a database processed using OCI. An OCI database provides a broad, deep, topically organized term space for automated and assisted ad word purchasing and for connecting users to final target web pages.

In another aspect, the systems and methods described herein relate to a method for selecting ad words for purchase. The method includes processing an information database using OCI and one or more seed topics to derive candidate ad words. The method further includes receiving estimated upper and lower cost per click (CPC) values for respective candidate ad words from, e.g., an ad word traffic estimator such as the Google® AdWords® traffic estimator provided by Google, Inc. of Mountain View, Calif. A CPC value represent cost for one click on an advertisement related to an ad word. The method further includes computing estimated upper and lower marketing break even (MBE) values for the respective candidate ad words based on their CPC values. The estimated MBE values represent the volume of desired actions, e.g., a purchase, necessary for the advertisement costs to "break even" or have sales revenue equal to advertising costs. The method further includes computing an average MBE value for respective candidate ad words based on their respective upper and lower MBE values. The method further includes selecting ad words from the candidate ad words as a function of their respective average MBE values.

In some embodiments, the method includes computing a global MBE average across all candidate ad words. The method further includes selecting ad words from the candidate ad words that have average MBE values below the global MBE value. In some embodiments, the method includes receiving measured upper and lower CPC values for a selected ad word based on performance data for an advertisement deployed based on the selected ad word. The method further includes computing a measured average MBE value for the selected ad word and recommending discontinuation of advertisements based on the ad word if the ad word's measured average MBE value is higher than a given threshold, e.g., the global average MBE described above. Having an average MBE value higher than the global average MBE may indicate that the ad word may not be effective in reaching the advertiser's target audience.

In yet another aspect, the systems and methods described herein employ orthogonal corpus indexing (OCI) to generate an advertiser database, also referred to as a competitive marketing database. By querying search engines with various advertising keywords, information regarding advertisements shown in response to the keywords can be built into a database. Such a database includes information that can be organized per advertiser. For example, the database may enable construction of an index of topically organized keywords per advertiser. Fine-grained classification of ad and web content may reveal the topic space in which advertisers buy their ad words. The database may be further augmented by processing advertisers' web sites and other information such as public filings, products description pages, and annual reports, and inserting this information into the advertiser database. Such an advertising database may facilitate comprehensive analysis of advertisements and related content from competitors, and help an advertiser buy ad words and create advertisements that differentiate themselves from competitor advertisements and are, therefore, more effective and better focused to their target audience. In some cases, the advertising database may help an advertiser mimic competitor keywords in order to draw traffic from competitor web pages to their web pages.

In yet another aspect, the systems and methods described herein relate to a method for creating an advertising database. The method includes processing an information database using orthogonal corpus indexing and a seed topic to derive keywords. The method further includes querying a search engine with a first keyword of the keywords, and processing the provided results page to determine content relating to a classification such as an advertiser, an advertisement, an ad word, and an advertising link page. The method further includes inserting the determined content with respective classification in the advertising database. In some embodiments, the method further includes receiving content related to an advertiser, such as the advertiser's web page, a public filing, a product description, or an annual report. The method includes processing and classifying the received content to insert into the advertising database.

In yet another aspect, the systems and methods described herein employ OCI to generate content for web pages, advertisements, and/or other suitable Internet documents. The system may generate content for a web page to improve its page rank in a search engine. Building web pages with a higher position (closer to the top of a search result page) is sometimes referred to as SEO (Search Engine Optimization). OCI may be used to determine content from a content database that when added to a web page improves the rank of that page in a search engine. In some embodiments, the system may generate content to form a new web page. Similarly, OCI may be used to determine content for an advertisement to improve its ad rank in a search engine. Analogous to page rank, ad rank determines the relative position of an advertisement in advertising listings displayed by a search engine. In some embodiments, the system may generate content to form a new advertisement. In some embodiments, OCI may be used to generate keywords to query a search engine for related web pages. The system may extract content from web pages found in response to the search query and add the content to a web page or an advertisement. In some embodiments, the keywords may be provided to a natural language text generator that can synthesize new text to add to the web page or advertisement.

In yet another aspect, the systems and methods described herein relate to a method for improving the ranking in a search engine of a web page. The method includes processing a database using OCI to derive keywords relating to content in the database. The method further includes processing a web page to determine a first keyword relating to content in the web page, and selecting content from the database based on the first keyword. The method further includes adding the selected content to the web page to improve search engine page rank of the web page.

In some embodiments, the selected content includes text, audio, an image, a video, and/or a web link. In some embodiments, the web page is displayed in response to a user search query in a search engine, and the first keyword is determined based on the web page and the user search query. In some embodiments, the method further includes generating content based on the first keyword using a natural language text generation algorithm, and adding the generated content to the web page to improve the page rank of the web page. In some embodiments, the method further includes querying a search engine based on the first keyword, and extracting content from web pages provided by the search engine in response to the query. The content may be added the content to the web page to improve the page rank of the web page.

In yet another aspect, the systems and methods described herein relate to a method for generating content for an advertisement. The method includes processing a database using OCI to derive keywords relating to content in the database. The method further includes receiving an ad word related to the advertisement and determining a first keyword relating to the received ad word. The method further includes selecting content from the database based on the first keyword, and adding the selected content to the advertisement for display.

In some embodiments, the selected content includes text, audio, an image, a video, and/or a web link. In some embodiments, the advertisement is displayed in response to a user search query in a search engine, and the first keyword is determined based on the received ad word and the user search query. In some embodiments, the method further includes generating content based on the first keyword using a natural language text generation algorithm, and adding the generated content to the advertisement for display. In some embodiments, the method further includes querying a search engine based on the first keyword, and extracting content from web pages provided by the search engine in response to the query. The content may be added to the advertisement to improve the ad rank of the advertisement in a search engine.

In yet another aspect, the systems and methods described herein provide systems for document indexing and scoring of content on a computer database, such as the World Wide Web. The systems generally include an orthogonal corpus that may comprise a collection of blocks of text, and that may be employed to index and score textual information for applications in retrieving, classifying, or browsing over a set of documents.

An orthogonal corpus, as the term is employed herein, may be understood to encompass, without being limited to, any collection of blocks of text that are outlined or referenced by a table of contents, topic index, chapter heading or other topical indicia where each topic either stands alone or is an identified subpart (subtopic) of another topic, forming a tree of topics and their descendant subtopics. Encyclopedias, text and reference books, periodicals, web sites, dictionaries, thesauri, the library of congress, the Dewey decimal system, and glossaries are examples of, surrogates for, or extenders of orthogonal corpora. A set of topics is understood as orthogonal in the sense that substantially every member topic (e.g., chapter or article) covers a different concept or substantially different concept than any other topic under the same ancestor topic in the tree. A topic in one practice may be assumed to include or not include, its ancestor topics or underlying subtopics.

The orthogonal construction, or decomposition, of a corpus provides for algorithmic identification of keywords in each topic, which distinguish it from its sibling, cousin, ancestor, or descendent topics. Keywords may be employed to numerically score over an underlying pool of documents. Alternatively, if more practical for a given application, such as when working with a large document collection, rather than individually score all documents in the collection against the keywords, then a set of search words may be generated to identify a subset of candidate documents for scoring.

Parameters employed during the scoring process may relate to the identification of keywords and their refinement into a set of search words, with weightings for associated document or sub-document scoring. The scoring, search term, and keyword methods may employ conventional information retrieval techniques including the use of synonyms, stemming, frequency, proximity, stop words, hyponyms, and synonyms.

For purposes of clarity certain terms will now be described, although the understandings set forth are not to be understood as limiting and are only provided for purposes of achieving clarity by way of providing examples. The term "word" as employed herein may be understood to encompass a lexical type found in a common or specialty dictionary of any language. The term "phrase" as employed herein may be understood to encompass any sequence of one or more words. Heretofore for simplicity we use "Word" to mean "Word or Phrase." The term "synonym group" shall be understood to encompass a set of words which may be used as alternates for a given word. Each word in a synonym group has a similar or identical meaning. The term "topic" shall be understood to encompass textual content typically having a title, having corresponding text, concerning a single topic, or covering a set or tree of related subtopics. The term "subtopic" shall be understood to encompass a block of text within a Topic. Typically, a subtopic may be identified by its subtopic header or other outline indicator. In different calculation contexts, subtopics may or may not be included as part of parent topics. The term "word count" maybe understood as an integer count of the number of times a word or a word in its synonym group occurs in a given topic or text area, potentially including text in the title and headers and any text elements in that text. The term "word frequency" may be understood to encompass the word count in a text area divided by the number of words total in that text. A word map is a representation of textual content within a text area that is more precise than a word count. A word map may describe a word's relative location in the text, its linguistic type or contexts of use, its prominence indicators such as use in a title or highlighting fonts. The term orthogonal corpus may be understood to encompass a collection of topically organized information referenced by a table of contents and/or index, where each topic is clearly identified as a SubTopic of a topic or else stands alone. Nodes in the table of contents tree may represent topics. The information may be understood as orthogonal in the sense that a stand-alone topic (e.g., chapter or article) covers a substantially different concept than any other stand-alone topic, and any subtopic expresses a substantially different concept from any other subtopic within the same parent topic. The term document may be understood to encompass formatted textual content with topic beginnings, endings, and marked hierarchy. A document may contain one or more topics and may include subtopics. A corpus may include one or more documents. The relationship between documents and topics is not mandated, though in some embodiments each document to represent one top-level topic along with its subtopics. The term "discovered document" may be understood to encompass a document (or a set of documents such as a web site or portion of a web site) which is being scored. Scoring of a discovered document may be relative to one or more corpus documents or corpus topics. In one practice, scoring measures the degree of topical relevance to the corpus topics. The discovered document will often be a member of a search result set.

More particularly, the systems and methods described herein include methods for processing a body of reference material to generate a directory for accessing information from a database. These methods may comprise processing the body of reference material to identify a hierarchical organization of a plurality of topics. Additionally, the processes may include the step of associating with at least one of the topics a portion of the reference material and processing the assigned portion of reference material to generate a plurality of search keys representative of search strings for selecting information from the database. The process may then apply the search keys to the database to retrieve information from the database and may create an association between the at least one topic and the information retrieved from the database.

In an optional step, the methods described herein may create a graphical interface that is representative of the identified hierarchical organization of a plurality of topics for allowing a user to access information retrieved from the database and having an association with the topic. Accordingly, the user may be provided with a graphical interface that allows the user to activate, typically by clicking with a mouse, a graphical representation of a topic to identify a set of links to content, such as web pages that are associated with the topic selected by the user.

In one practice, processing the body of reference material includes processing a body of reference material that has been selected from the group consisting of an encyclopedia, a dictionary, a text book, a novel, a newspaper, or a website. Processing the material may include identifying a hierarchical organization of a plurality of substantially orthogonal topics. This may include identifying a table of contents for the body of reference material, identifying an index for the reference material, identifying chapter or subchapter headings within the reference table, identifying definition entries within a dictionary, and other similar operations that identify different topics that occur within the reference material.

Optionally, when processing a body of reference material, the process may normalize the identified hierarchical organization of the plurality of topics.

In one practice when processing the assigned text, the process includes a step of generating a word map that is representative of a statistical analysis of the words contained in the assigned text. Generating the word map may include performing a word count process for determining word frequency of a word within the assigned text and for employing the word frequency for determining the relevance of a word to the associated topic. Processing the assigned text for different topics may also include a step of identifying a set of key words that have an associated measure intra-document orthogonality.

In an optional step, processing the assigned text may include identifying a set of synonyms for extending the search keys. Further, a subset of search keys may be selected that have a predetermined measure of correlation to the topic. The search keys may be applied to the database such as through an Internet search engine, to discover documents that are related to the search keys. Optionally, the Internet search engine may be a meta-search engine.

Once documents have been discovered from the database that are related to the search keys, documents may be further processed to determine their relationship to the topics associated with the search keys.

In the methods described herein creating an association between the at least one topic and the information retrieved from the database may include capturing a location pointer that is associated with the information retrieved from the database. Creating that association may include generating a data structure for the topic which allows storing location pointers that are associated with information retrieved from the database.

In another aspect, the systems and methods described herein include systems for organizing a collection of documents. Such systems may comprise an orthogonal corpus of information that is arranged according to an index of topics, a keyword generator for generating a set of keywords representative of a documents associated with a topic in the index of topics, a scoring system for processing documents within the collection of documents to associate with at least a portion of the documents a score representative of the document's association to a particular topic, and a graphical representation for depicting at least a portion of the index of topics and having respective portions of the graphical representation linked to documents associated with a respective portion of the index of topics.

In a further embodiment the systems described herein may include systems for extending the content of the document. These systems can include a parser for selecting terms within the document to be extended, an orthogonal corpus of information arranged according to an index of topics, a keyword generator for generating a set of key words representative of a documents association with a topic in the index of topics, and a linking system for processing the documents within a collection of documents, to associate with at least a portion of the document, a score representative of the documents association to a particular topic and for providing the first document with links to the collection of documents for extending the content of that document.

Accordingly, the systems and methods described herein may leverage the electronically stored content of the World Wide Web in an intelligent and meaningful way, to provide a database of content organized under an orthogonal and hierarchical index of topics and subtopics.

Other objects of the systems and methods described herein will, in part, be obvious, and, in part, be shown from the following description of the systems and methods shown herein.

BRIEF DESCRIPTION OF THE DRAWINGS

The foregoing and other objects and advantages of the systems and methods described herein will be appreciated more fully from the following further description thereof, with reference to the accompanying drawing wherein;

FIGS. 5-9 depict a further practice organizing content according to indices generated from a plurality of references, according to an illustrative embodiment;

FIG. 11 shows an illustrative output of a keyword traffic estimator, according to an illustrative embodiment;

FIG. 15 shows an illustrative embodiment of information gathered for inclusion in an advertising database, according to an illustrative embodiment;

DETAILED DESCRIPTION

Figure 1:
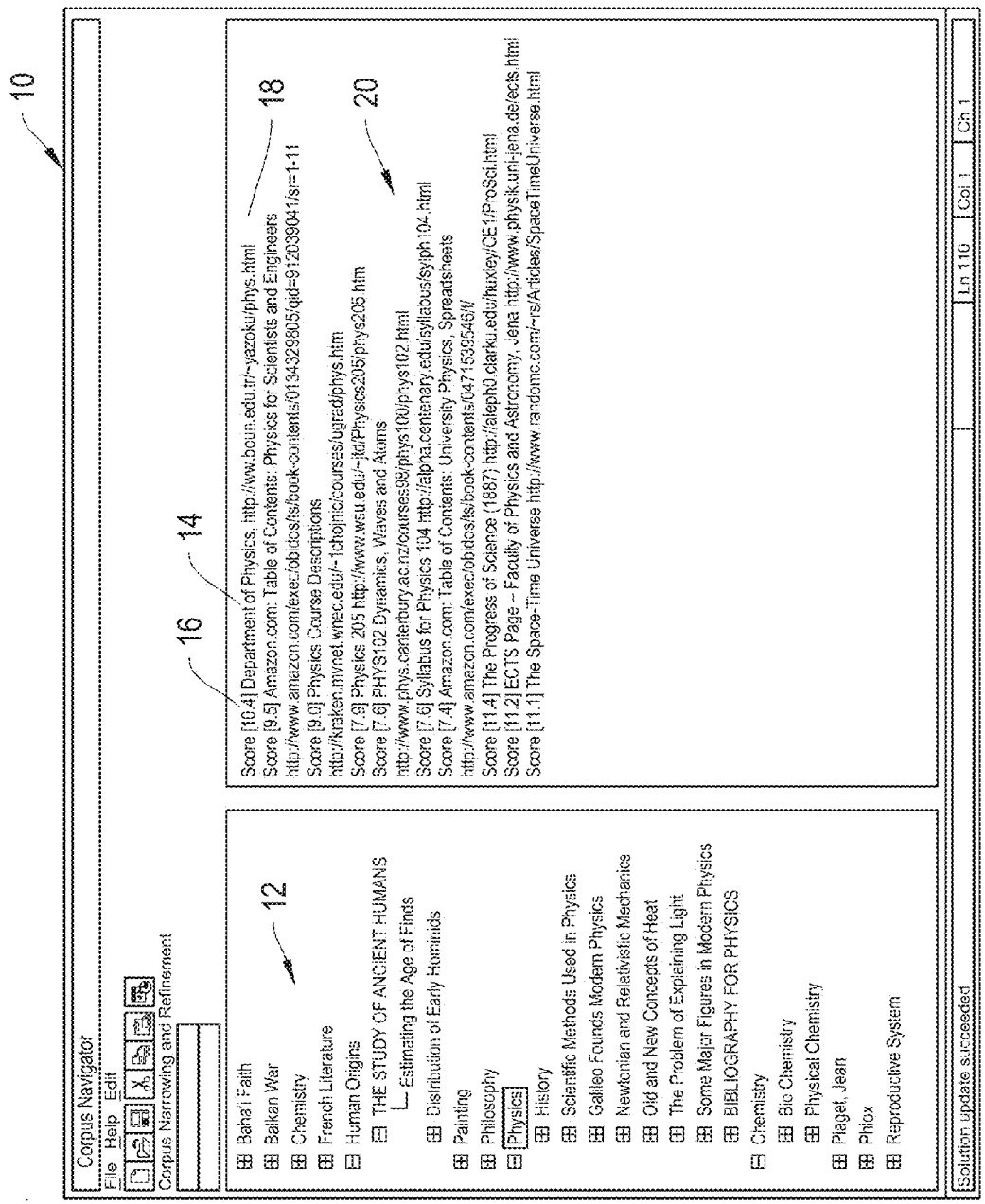
FIG. 1 depicts a screen shot of a portion of a orthogonal corpus and a set of documents and the scores associated with those documents.
Figure 2:
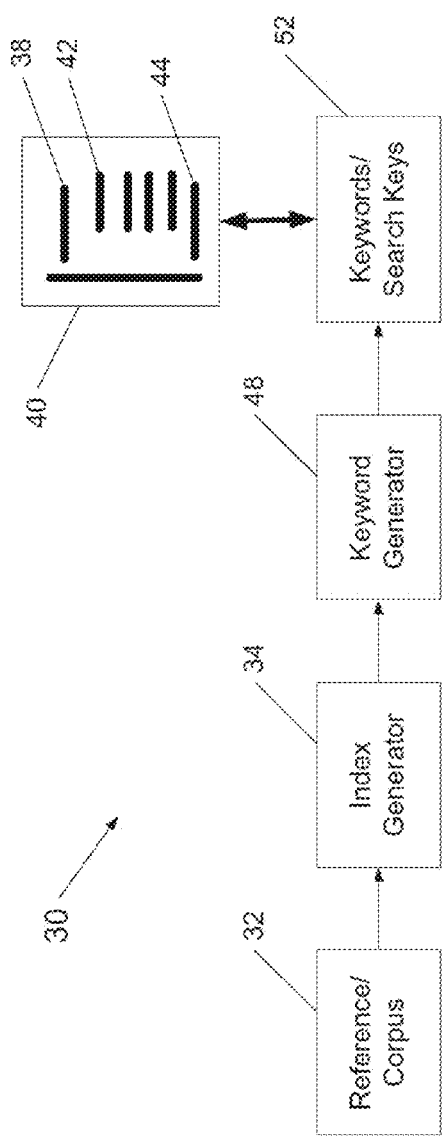
FIGS. 2A through 2B depict a dataflow diagram of one process for processing a body of reference material for organizing a collection of documents according to a hierarchical arrangement of topics provided by the reference material, according to an illustrative embodiment.

To provide an overall understanding of the systems and methods described herein, certain illustrative embodiments will now be described. However, it will be understood by one of ordinary skill in the art that the systems and methods described herein can be adapted and modified to provide systems and methods suitable for other applications and that other additions and modifications can be made to the illustrated embodiments without departing from the scope hereof.

In one aspect, orthogonal corpus indexing (OCI) is employed for selecting ad words for purchase. Advertisers pay search engines for placement of their advertising along side results in search results pages provided by the search engines, when a given word or phrase appears in a user's search query. Such words or phrases are sometimes referred to as ad words. A system employing an OCI database may enable automated selection of related and discriminating terms, identifying keywords that increase the ratio of ads clicked-through to money spent on keyword buying. In addition to selecting positive words that are related to the advertiser and invoke their advertisement, an OCI database may also indicate negative ad words—words with negative correlation to the concept of interest which can be used to prevent an advertisement from being shown. For example, if a user enters a search query such as "apple fruit", an advertiser may desire an advertisement for laptops from Apple Computers® to be prevented from being shown. In such a case, the advertiser may buy "apple" as a positive keyword and "fruit" as a negative ad word related to their advertisement. Further details may be found with reference to FIGS. 10-12B below.

In another aspect, orthogonal corpus indexing (OCI) is employed for generating an advertiser database, also sometimes referred to as a competitive marketing database. By querying search engines with various advertising keywords, information regarding advertisements shown in response to the keywords can be built into a database. Information in such a database may be organized per advertiser. For example, the database may enable construction of an index of topically organized ad words used in advertisements for a number of advertisers. Fine-grained classification of ad and web content may reveal the topic space in which advertisers buy their ad words. The database may be further augmented by processing the advertiser's web sites and other information such as public filings, products description pages, and annual reports, and inserting this information into the advertiser database. Such an advertising database may facilitate comprehensive analysis of advertisements and related content from competitors, and help an advertiser buy ad words and create advertisements that differentiate themselves from competitor advertisements and are, therefore, more effective and better focused to their target audience. In some cases, the advertising database may help an advertiser mimic competitor keywords in order to draw traffic from competitor web pages to their web pages. Further details may be found with reference to FIGS. 13-15 below.

In yet another aspect, orthogonal corpus indexing (OCI) is employed in a system for generating content for web pages, advertisements, and/or other suitable Internet documents. The system may generate content for a web page to improve its page rank in a search engine. Building web pages with a higher position (closer to the top of a search result page) is sometimes referred to as SEO (Search Engine Optimization). OCI may be used to determine content from a content database that when added to a web page improves the rank of that page in a search engine. In some embodiments, the system may generate content to form a new web page. Similarly, OCI may be used to determine content for an advertisement to improve its ad rank in a search engine. Analogous to page rank, ad rank determines the relative position of an advertisement in advertising listings displayed by a search engine. In some embodiments, the system may generate content to form a new advertisement. In some embodiments, OCI may be used to generate keywords to query a search engine for related web pages. The system may extract content from web pages found in response to the search query and add the content to a web page or an advertisement. In some embodiments, the keywords may be provided to a natural language text generator that can synthesize new text to add to the web page or advertisement. Further details may be found with reference to FIGS. 15-17 below.

FIGS. 1-9 and their description below provide background information on systems and methods for applying orthogonal corpus indexing. In particular, the systems and methods described herein provide for indexing and cataloging of content on the Internet, as well as from other stores of information, by applying a process that employs an orthogonal corpus, or corpora, of information, such as an Encyclopedia. To this end, the processes described herein identify the topics discussed within the corpus. The process also identifies within the corpus a set of keywords that are relevant to the topics presented in the corpus. The keywords associated with a topic may be employed to identify documents stored in another database that are related to the topic. A graphical representation of the index of topics found in the corpus may then be generated, with individual topics operating as links to these related documents. Thus, a user interested in reviewing content in the corpus related to a certain topic, may also activate a link in the graphical representation of the index to access other documents that have been identified as related to the topic of interest to the user.

Turning to FIG. 1, there is depicted a graphical user interface 10 of the type created and employed by systems according to an illustrative embodiment. The graphical user interface 10 represents a topic index 12, a portion of which is shown in this illustration. The topic index 12 may be a graphical representation of the table of contents of an encyclopedia, or other corpus. A user may employ the graphic interface 10 to access information that relates to the different topics listed in the index 12. Additionally, the depicted index 12 includes topics and subtopics, including subtopics of the same ancestor topic. For example, in FIG. 1, the topic Human Origins is the ancestor topic for the subtopics, The Study of Ancient Human and the Distribution of Early Hominids. A topic, or a subtopic, may be understood to include, optionally, its ancestor topics or underlying subtopics.

The graphical representation of the index 12 may include a hypertext link, or other linking mechanism, for each topic or subtopic in the index 12. For example, the user may activate the links, as depicted by the highlighted topic PHYSICS in FIG. 1, to retrieve a group of documents having content that is associated with the selected topic. As further depicted by FIG. 1, the system 10 may provide a display 20 such that for a selected topic or a subtopic, such as the selected topic Physics, a document 18, or a plurality of documents 18, may be presented to the user as documents associated with the topic. In the depicted embodiment, a pointer to the document, such as the title and URL 14 may be presented to the user. Additionally, an associated numerical score 16, that represents that document's association to the topic may also be presented. The development of such scores 16 will be described in more detail hereinafter. Optionally, all the documents associated with a topic may be displayed in a window 20 of the system 10.

Turning now to FIGS. 2A and 2B, dataflow diagrams are presented that illustrate one process for creating a graphical interface, such as the interface 10 of FIG. 1. Specifically, FIGS. 2A and 2B depict a process 30 wherein a corpus, such as an existing published book of reference material, is processed by an orthogonal corpus indexing (OCI) process that extracts content signatures and topic indices from the corpus' content. The depicted process employs the content signatures to generate search strings for search engines to identify content associated with topics described in the corpus. The retrieved or discovered documents may be examined for content relevance and the relevant documents may be associated with topics presented in the orthogonal index of the corpus. Optionally, site attributes such as document type, timeliness, source and other such attributes may also be identified and employed to select relevant websites that may be associated with a topic in the index of the orthogonal corpus.

More specifically FIG. 2A depicts that the process 30 operates on a corpus 32 that may be input to the index generator 34. The index generator 34 may generate an index for the corpus 32 and this index may be provided to the keyword generator 48. The keyword generator 48 may produce a set of key words 52 and may be associated with the index 40. The process 30 continues in FIG. 2B which shows the index 40 in the search keys 52 being applied to a search engine 54. The search engine 54 discovers documents from a database of content, or from a collection of databases of content 58 to thereby create an association between at least one of the topics of the index 40 and the information retrieved from the database 58.

The depicted corpus 32 may be any collection of information and may include, but is not limited to, encyclopedias, text books, dictionaries, thesauruses, atlases, maps, and other reference material. In one embodiment, the corpus 32 may be a published book that may be turned into or stored in an electronic format such as a conventional computer data file of text information. The corpus 32, preferably in an electronic format, may be provided to the index generator 34. The index generator 34 may process the corpus 32 to identify a hierarchical organization of a plurality of topics that appear within the corpus 32. To this end, the index generator 34 may decompose the corpus 32 to create a standard hierarchical topic orientation that is capable of assigning text content to title, headers, topics, subtopics, or any other device that may be employed for representing a section of text related to a topic, meaning, category, or some other similar abstraction.

U.S. Pat. No. 5,963,203 entitled "Automatic index creation for a word processor" issued to Sotomayor, Bernard, describes methods that may be employed by the index generator 34. For example, Sotomayor describes methods that enable scanning one or more documents to automatically identify key topics and phrases in a document's text, as well as methods to generate an index to those key topics. Similarly, U.S. Pat. No. 5,819,258 entitled "Method and apparatus for automatically generating hierarchical categories from large document collections", by Vaithyanathan, Shivakumar, Travis, Robert, and Prakash, Mayank, further describes techniques that may be employed by the index generator 34 for determining an index for a corpus. Other techniques known in the art may also be employed by the index generator 34 without departing from the systems and methods described herein.

In an alternative practice, the index generator 34 allows an operator to identify the type of corpus 32 being input into the index generator 34. For example, the index generator 34 may present an interface to the operator that allows the operator to identify whether the corpus being presented comprises and encyclopedia, a dictionary, a textbook, or another known type of reference document. Additionally, the index generator 34 may allow the operator to identify whether the corpus 32 includes a table of contents, an index, chapter heading, or any other representation of the different topics contained within the corpus. In this embodiment, the user may identify, for example, that the corpus 32 comprises an encyclopedia and that the encyclopedia includes a table of contents that is representative of the index of orthogonal topics maintained within the encyclopedia. In this embodiment, the index generator 34 may process the presented corpus 32 to identify the table of contents for the encyclopedia. This table of contents, in one embodiment, may be formatted into an HTML document that presents the table of contents in an organized format that emphasizes the topics, subtopics and other hierarchical structure of the table of contents. In one process the index generator 34 processes the notation for the table of contents, such as the topic numbering employed, to identify which topics are understood as parent topics and which are understood as main topics and which are understood as subtopics. In a further optional embodiment, the index generator 34 may present the generated index with the orthogonal corpus 40 to the operator to allow the operator to edit or amend the generated index for the orthogonal corpus 40.

As shown in FIG. 2A, once the index generator 34 has processed the corpus 32 the index generator 34 may present the index 40 for the corpus 32 to the keyword generator 34. The index 40 may comprise a hierarchical representation of the orthogonal topics maintained within the corpus 32. This hierarchical representation may include primary topics, such as the depicted topic 38 and a plurality of subtopics 42 that are associated with the primary topic 38.

The keyword generator 48 in one embodiment operates to identify sections of text of the corpus 32 to be associated with the different topics and subtopics of the index 40. Continuing with the above example, in those practices where the index 40 is generated from the table of contents for the corpus 32, the keyword generator 48 may identify those pages that contain information associated with a topic presented within the index 40. For example, the keyword generator 48 may process the table of content for the corpus 32 to identify a page number associated with a topic, such as the topic 40 and may analyze the page associated with topic 40 to identify that portion of the page that may be associated with the topic 40. In one embodiment, where headings are presented within the corpus 32, the keyword generator 48 may analyze the page associated with the topic 40 to identify a heading that is representative of the beginning of the presentation within the corpus 32 of information that is associated with topic 40. For example, the keyword generator 48 may identify a section of text within the associated page that contains the information associated with topic 40 and that is presented in a type font and font size that is representative of a heading. In a subsequent step the keyword generator 48 may identify the location of the heading for the subsequent topic 44 that indicates the beginning of content related to the new topic. The keyword generator 48 may identify the content that is delimited by the heading 40 and 44 and associate that content as content related to the topic 40.

Once the portion of the corpus 32 that is to be associated with the topic 40 is identified, the keyword generator 48 may process this assigned portion of text to generate a plurality of search keys, each of which may be representative of a search string for selecting information from a database.

In one embodiment, the system 10 employs the orthogonal construction of the corpus for algorithmic identification of keywords in each topic that distinguish that topic from its sibling, cousin, ancestor, or descendent topics. Accordingly, the systems described herein may create a set of keywords for a topic that identifies a document associated with a topic and that are keywords which may act to distinguish documents associated with one topic, from documents associated with another topic. For example, the system 10 may employ processes that identify keywords that are associated strongly with a particular topic. Techniques for creating keywords will be understood from Deerwester, S., Dumais, S. T., Landauer, T. K. Furnas, G. W. and Harshman, R. A. (1990), "Indexing by latent semantic analysis." *Journal of the Society for Information Science*, 41(6), 391-407. Additionally, the system 10 may identify other keywords that act to disassociate a document from one or more other topics. These keywords may be employed by the system 10 to numerically score over an underlying pool of documents.

The system 10 may employ scoring methods that may utilize traditional information retrieval techniques including the use of synonyms, stemming, frequency, proximity, stop words, hyponyms, and synonyms. If, as in most large document collections, it is not practical for all documents to be individually scored against the keywords, then a subset of search words is selected to identify candidate documents for scoring. Keyword and search terms are identified based on a numerical method that apportions words among topics. The goal is for the keywords and search terms to identify individual blocks of text as found at the nodes of the orthogonal corpus topic hierarchy. In an ideal sense, the keywords would be partitioned across the hierarchical tree nodes, with each word occurring in only one corpus topic. In addition to word rarity among corpus topics, rarity in the underlying document pool may contribute to a word being identified as a keyword or search term for a given topic. For example, a keyword occurring in only one node and only once on the Web, would be a top candidate as a keyword and search term.

The keyword generator 48 may present as an output, a set of keywords 52 each of which may be associated with a topic or subtopic in the index 40. As described above, these keywords may be employed to act to distinguish documents associated with one topic from documents associated with another topic. Accordingly, as depicted in FIG. 2B the search keys 52 and associated topics on the index 40 may be presented to the search engine 54 for retrieving information from a database or databases of content 58. To this end, the process 30 applies the search keys to the database 58 to retrieve information from the database 58. In one practice as will be described in more detail hereinafter, an optional step in process 30 is performed wherein the search keys 52 are processed to identify a subset of search keys that may be employed for generating search queries to one or more search engines, such as Internet search engines, to discover a set of documents 60 which are relevant to the topic of interest. Each of the resulting documents 60 may be examined in a subsequent step to determine the relevance of the content contained within the index. The relevance may be scored, as further described below, for identifying the relevance of that document, and the score may be employed for ordering the sequence in which content is listed as being relevant to a particular document.

Once the discovered documents are scored for relevance, the process 30 may associate portions 62 of the discovered documents to associated topics within the index 38. In a practice wherein the database 58 includes links to URL's for websites, the process 30 may create a web database that contains website information such as URL's, types, dates, topics, contents, size and editor notes that are inserted or updated in the database from time to time. Information about the corpus 32 that has been processed, such as the publisher, the ISBN, and other types of information needed to purchase the book through an online transaction may also be stored. The search engine may then provide a navigation tool that comprises the HTML representation of the index 38 wherein topics and subtopics within the index 38 link to URL's of web content identified as being related to the topic or subtopic selected by the user. Optionally, in certain embodiments, the topics and subtopics may also include links to portions of the corpus 32 that are related to the topic selected by the user. In this way, a user may select a topic presented by the corpus 32 in view of the information presented by the corpus 32 and related information stored on the World Wide Web. In other embodiments, other techniques are employed for semantic processing and for determining a topic that can be associated with a portion of text within the corpus.

Figure 3:
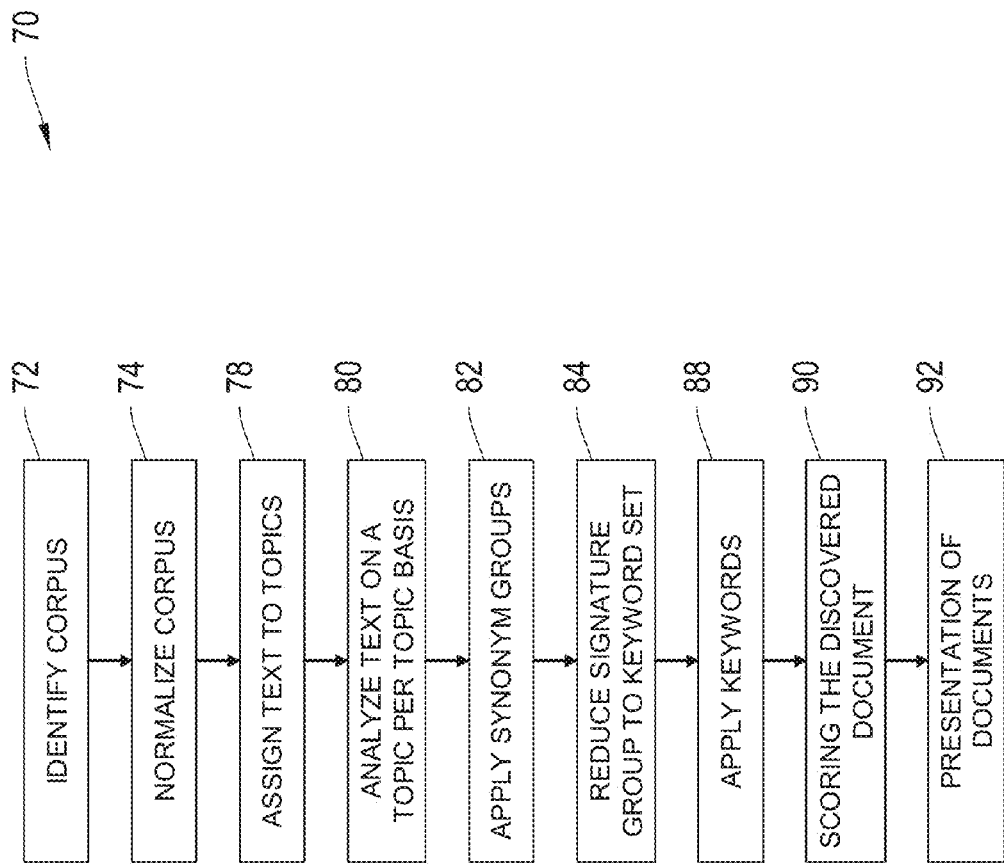
FIG. 3 depicts one flow chart diagram of an orthogonal corpus indexing process, according to an illustrative embodiment.

The data flow diagram depicted in FIGS. 2A and 2B may be implemented in a data processing process wherein a data processing program processes the corpus and generates an index that links topics in the corpus to information from a data sources, such as the Internet. Turning now to FIG. 3, a flow chart illustration of one such process is depicted. Specifically, FIG. 3 depicts a process 70 for extending a corpus by identifying topics covered by that corpus and employing information stored in the corpus and related to the topics to identify information in a database that is also related to the topic. The process 70 also generates an optional graphical user interface, such as the interface depicted in FIG. 1, that includes links for topics listed in the index, and that may be employed by a user to access the information associated with the listed topics.

The process 70 begins with the act 72 of identifying a corpus that is to be extended, such as by selecting a publication that contains reference material. In step 74, the process 70 transforms, or casts, the corpus into a normal form for processing. In one practice, this involves decomposing the document format of the corpus into a standard hierarchal topic orientation with a mechanism for assigning text content to title, headers, topics, and sub-topics. Optionally, stop words, such as the common words "and", "them", and "within", are identifies and removed during normalization.

After normalization, the process 70 proceeds to step 78 wherein the corpus is processed to identify which portions of the corpus relate to which topic. In one practice wherein the corpus includes a table of contents, the process 70 analyzes the document format of the corpus to locate within the text headings associated with the different topics. For example, as described in the above cited publication U.S. Pat. No. 5,963, 203 entitled "Automatic index creation for a word processor", header information set off by HTML tags may be identified to find indicia of topic entries in the document being processed. However, any technique for processing a document to identify the sections of text related to a topic may be applied, including other techniques for analyzing the mark up form language of the document.

Proceeding to step 80, the process 70 analyzes the topics to identify a signature that may be understood as representative of the semantics of the topic. In one practice, the process 70 creates a word map per topic and subtopic. To this end the process 70 in step 80 may create a summary representation of the words in the text based on the number of, location of, and proximity of words within each topic and sub-topic. Other factors may be employed, or substituted for these. Statistics are maintained on different parts of the document structure such as titles, headings, paragraphs, sentences, and image.

Table I depicts that several topics may be identified within the corpus. For example, Table I depicts that the processed corpus includes the topics Archaeology, Argentina, Arithmetic, Art, and Astronomy.

TABLE I

| Topic |
| --- |
| Archaeology |
| Argentina |
| Arithmetic |
| Art |
| Astronomy |

The process 70 in one practice may then determine for a given topic, the word count for the words that appear within the portion of text, or other content, associated with the respective topic. This is depicted in Table II, that shows an example of the word count, with stop words removed, for words that appear in the portion of the corpus related to the topic "Astronomy."

TABLE II

Word counts in Topic Astronomy

| Word | Count |
| --- | --- |
| actual | 1 |
| ad | 1 |
| adopted | 1 |
| advances | 2 |
| ancient | 3 |
| application | 2 |
| assigning | 1 |
| astronomer | 2 |
| astronomers | 2 |
| astronomical | 5 |
| Astronomy | 12 |
| astronomy | 11 |
| Astrophysicists | 1 |
| astrophysics | 1 |

In process 70, after the word count, and other statistics are determined, signatures are generated using orthogonalization. For example, in one practice, given the word counts or word maps for all or a selected subset of topics simultaneously, the process 70 assigns a weight based on word count to each word within each topic or subtopic. Where using word counts the weight may be defined as the count. When using the word map, the weight of a word in a topic or subtopic may be assigned by an intra-document scoring function. Any suitable technique any be employed for performing intra-document scoring. These signatures may be edited or cleaned manually to enhance the topical relevance and precision of the subsequent search and scoring process. Table III depicts an example signature for the topic "Astronomy."

TABLE III

Signature for Topic Astronomy

| Word | Count |
| --- | --- |
| Astronomy | 23 |
| earth | 9 |
| bodies | 5 |
| Astronomical | 5 |
| universe | 4 |
| celestial | 3 |
| circle | 3 |
| Observational | 3 |
| sky | 3 |
| Stars | 3 |
| Ancient | 3 |
| Daily | 3 |
| Heavenly | 2 |
| Astronomers | 2 |
| planet | 2 |
| relative | 2 |
| moved | 2 |
| heavens | 2 |

After determining a signature, the process 70 may perform the optional step, step 82, of applying synonym Groups. In this optional step, the process 70 extends the signatures with synonym groups. To this end, words are replaced by groups of word substitutes having similar or identical meaning. Table IV depicts such an extension.

TABLE IV

Astronomy Signature Post Synonym Reduction

| Word | Count |
| --- | --- |
| Astronom | 30 |
| earth | 9 |
| bodies | 5 |
| universe | 4 |
| celestial | 3 |
| Circle | 3 |
| Observational | 3 |
| Sky | 3 |
| stars | 3 |
| ancient | 3 |
| daily | 3 |
| Heavenly | 2 |
| planet | 2 |
| relative | 2 |
| moved | 2 |
| heavens | 2 |

After step 82, the process 70 may proceed to step 84, wherein the process reduces the signature to Keyword sets, optionally tailored for the search. The set of documents to be scored against a topic is preferably identified and manageable in size. The web for example is a large a document set to collect up and score against all web documents. Accordingly, in one practice traditional large scale search engines, such a Lycos and Alta Vista, may be used to identify a set of candidate relevant documents using a keyword set for search. Which subset of the Signature and synonym groups is included in the Keyword set may be determined based on a variety of measures including corpus document word count of the word and general frequency of the word. An example is presented in TABLE V.

TABLE V

| Word | Count |
| --- | --- |
| Astronomy | 30 |
| Earth | 9 |
| Bodies | 5 |
| Universe | 4 |
| Celestial | 3 |
| Circle | 3 |
| Observational | 3 |
| Sky | 3 |
| Stars | 3 |
| Ancient | 3 |
| Daily | 3 |

The keyword set may be applied to a search mechanism to pull in multiple discovered documents based on the keyword set. This may occur in step 88. For example, the query Find: Astronomy or Astronomical or Astronomers or earth or bodies or universe or celestial or circle or Observational or sky or stars or ancient or daily; may be generated from the keyword set and applied to the search mechanism to discover documents related to the selected topic.

After the step 88, the process 70 may proceed to step 90 for scoring of the discovered documents. The many discovered documents returned from a search function may be assigned individual scores against the corresponding corpus topics and subtopics. Scoring may be based on multiple tunable metrics and rules including functions over the word count or word map data structures. The score of topical overlap between two documents as a baseline is measured as a dot product of word counts or word frequencies within those documents).

Scoring Example

| Word | Count in Astronomy | Count in discovered document | Score Contribution |
| --- | --- | --- | --- |
| Astronomy | 30 | 2 | 0.555556 |
| earth | 9 | 1 | 0.083333 |
| bodies | 5 | | |
| universe | 4 | 5 | 0.185185 |
| celestial | 3 | | |
| circle | 3 | 2 | 0.055556 |
| Observational | 3 | | |
| sky | 3 | | |
| stars | 3 | | |
| ancient | 3 | 1 | 0.027778 |
| daily | 3 | 2 | 0.055556 |
| Heavenly | 2 | | |
| planet | 2 | | |
| relative | 2 | | |
| moved | 2 | 1 | 0.018519 |
| heavens | 2 | 1 | 0.018519 |

After step 90, the process 70 proceeds to optional step 92, wherein the topic hierarchy and set of associated documents may be presented directly through an HTML or graphical user interface, such as the interface depicted in FIG. 1. Alternatively, content may be delivered though software API's (application program interfaces) to allow integration of output content with other content. Content may be navigated by walking the directory tree structure, or by keyword searching over the directory structure trees, corpus content, or discovered document content. Search results may point to topic paths or discovered documents.

Figure 4:
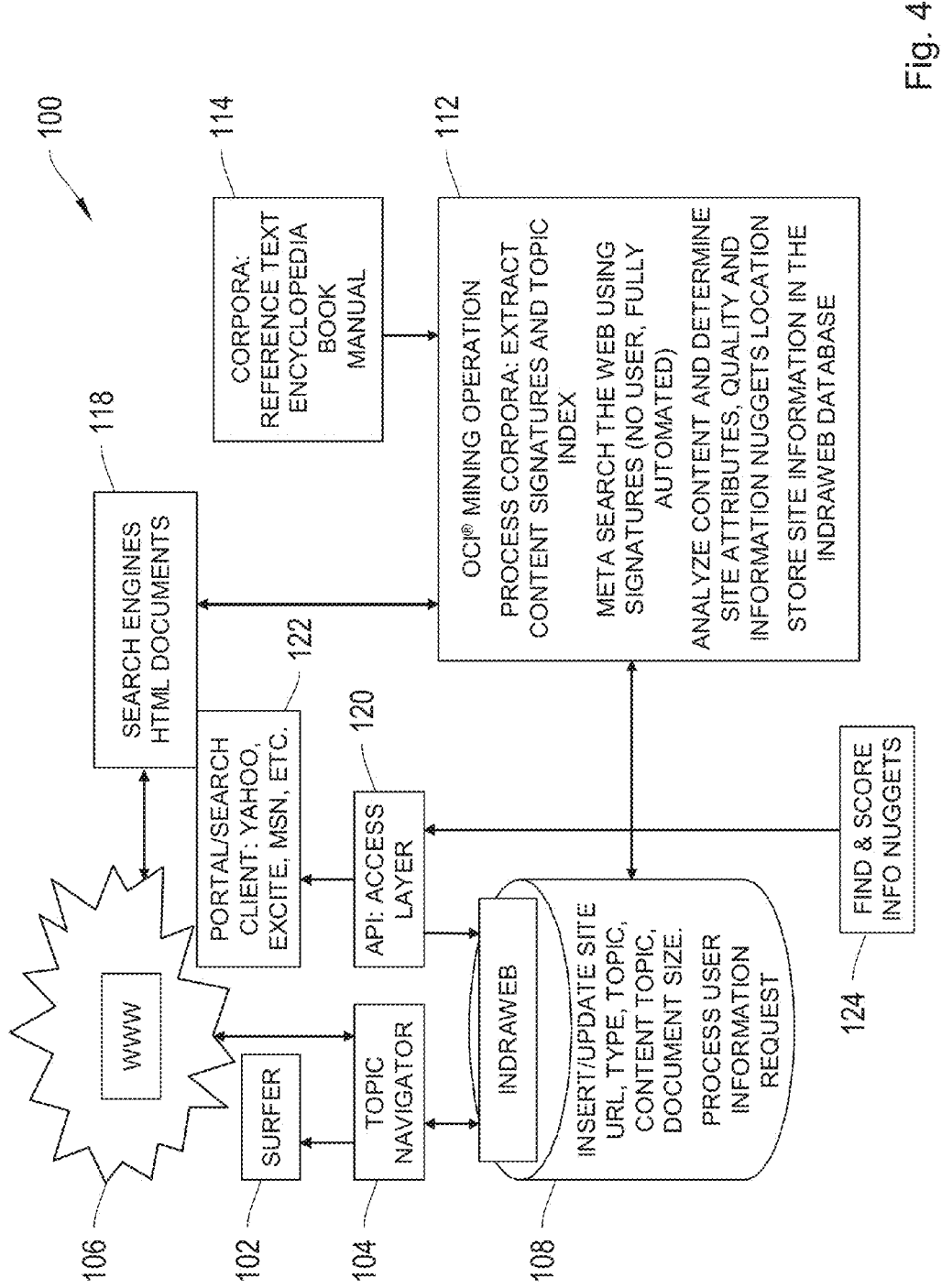
FIG. 4 depicts one system for orthogonal corpus indexing, according to an illustrative embodiment.

FIG. 4 depicts one embodiment of the system 100. Specifically FIG. 4 depicts a functional block diagram that shows a system 100 that allows a surfer 102 to access a user interface 104 that couples to a database system 108. The database system 108 further couples to an OCI processor 112 that accesses a database of corpora 114 and a plurality of search engines 118. The database system 108 further couples to an application programming interface access layer 120 and through the API 120 can access a portal/search client 122. Additionally, the API 120 may also couple to a scoring mechanism 124.

More particularly, FIG. 4 depicts that a user 102 such as an Internet user may access a user interface 104, that may be similar to the user interface depicted in FIG. 1. As shown in FIG. 1 the user interface 10 may present to the user 102 a list of topics 112. The user 102 may select a topic from the index 112. As described with reference to FIG. 1, the selection of a link directs the user interface 104 to retrieve information from the database system 108. The database system 108 processes the users request from user 102 for information related to the selected topic.

The database system 108 may be any suitable database system, including the commercially available Microsoft Access database, and can be a local or distributed database system. The design and development of suitable database systems are described in McGovern et al., *A Guide To Sybase and SQL Server*, Addison-Wesley (1993). The database 108 can be supported by any suitable persistent data memory, such as a hard disk drive, RAID system, tape drive system, floppy diskette, or any other suitable system.

As further depicted by FIG. 4 that database system 108 may communicate with the OCI mechanism 112. The OCI mechanism 112 may be, in one embodiment, a computer process capable of implementing a process such as process 70 depicted in FIG. 3. The OCI mechanism can be realized as a software component operating on a conventional data processing system such as a Unix workstation. In that embodiment, the OCI mechanism can be implemented as a C language computer program, or a computer program written in any high level language including C++, Fortran, Java or basic. Techniques for high level programming are known, and set forth in, for example, Stephen G. Kochan, Programming in C, Hayden Publishing (1983). Accordingly, the OCI mechanism 112 may be employed by a system administrator to process corpora stored within the database 114. As discussed with reference to FIG. 3, the processed corpora results in a graphical user interface that may be stored within the database mechanism 108 and accessed by the user 102 through the topic navigator 104. Additionally, the OCI mechanism 112 may generate for the processed corpora of database 114 a set of links or pointers to content that corresponds with different listed topics within the index of the processed corpora. The OCI mechanism 112 may also store these associated links within the database system 108.

To this end, the OCI mechanism 112 may couple to one or more search engines 118 that allow the OCI mechanism 112 to retrieve content from a database source. In the depicted embodiment of FIG. 4, the database source that search engines 118 access is the World Wide Web 106. In this embodiment, the user interface 104 also couples to the World Wide Web 106 so that links activated by the user that relate to URL's of content stored on the World Wide Web 106 may be directly accessed by the user 102 through the user interface 104 through the connection between the user interface 104 and the World Wide Web 106. FIG. 4 further depicts that the database 108 communicated with an API layer 120. As shown in FIG. 4 the API layer sits between the portal search client 122 and the database system 108 and also sits between the scoring mechanism 124 and the database system 108. Accordingly, a portal search client such as the Yahoo site may access the database system 108 through the API layer to provide users with access to an index linked to content on the World Wide Web.

Similarly, FIG. 4 depicts the scoring mechanism 124. The scoring mechanism 124 may be a computer process that accesses the database system 108 through the API 120. The scoring mechanism may perform data mining for identifying topics that are to be associated with different websites. In this way, the database system 108 may be employed for categorizing web sites according to their content. Thus, the system 100 depicted in FIG. 4 provides a system for categorizing information stored on the World Wide Web. The system described in FIG. 4 may operate on any suitable computer hardware, such as PC compatible computer systems, Sun workstations, or any other suitable hardware. The list of topics and the associated documents, or links to documents may then be stored in a relational database, or any suitable database with proper indexing for allowing rapid accessing of the data stored therein.

Once the system is operating, the system may be employed to provide a set of tools, such as that may operate as stand alone applications for single users, or that may be tools provided as client/server programs over a network. The tools may be provided as a collection of functions incorporated into an integrated research tool, or may co-exist as individual functions in a separate application.

Figure 5:
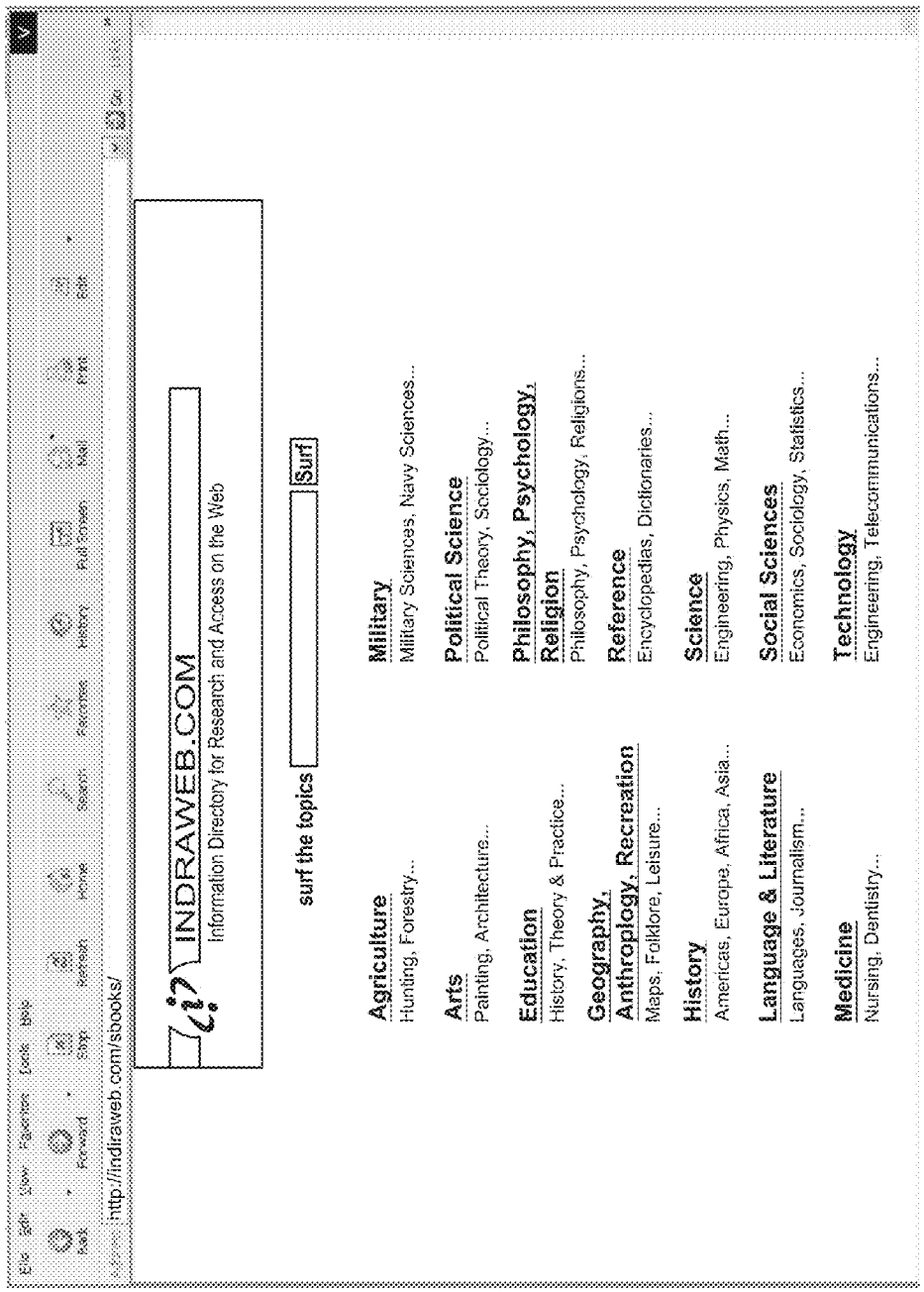
Figure 6:
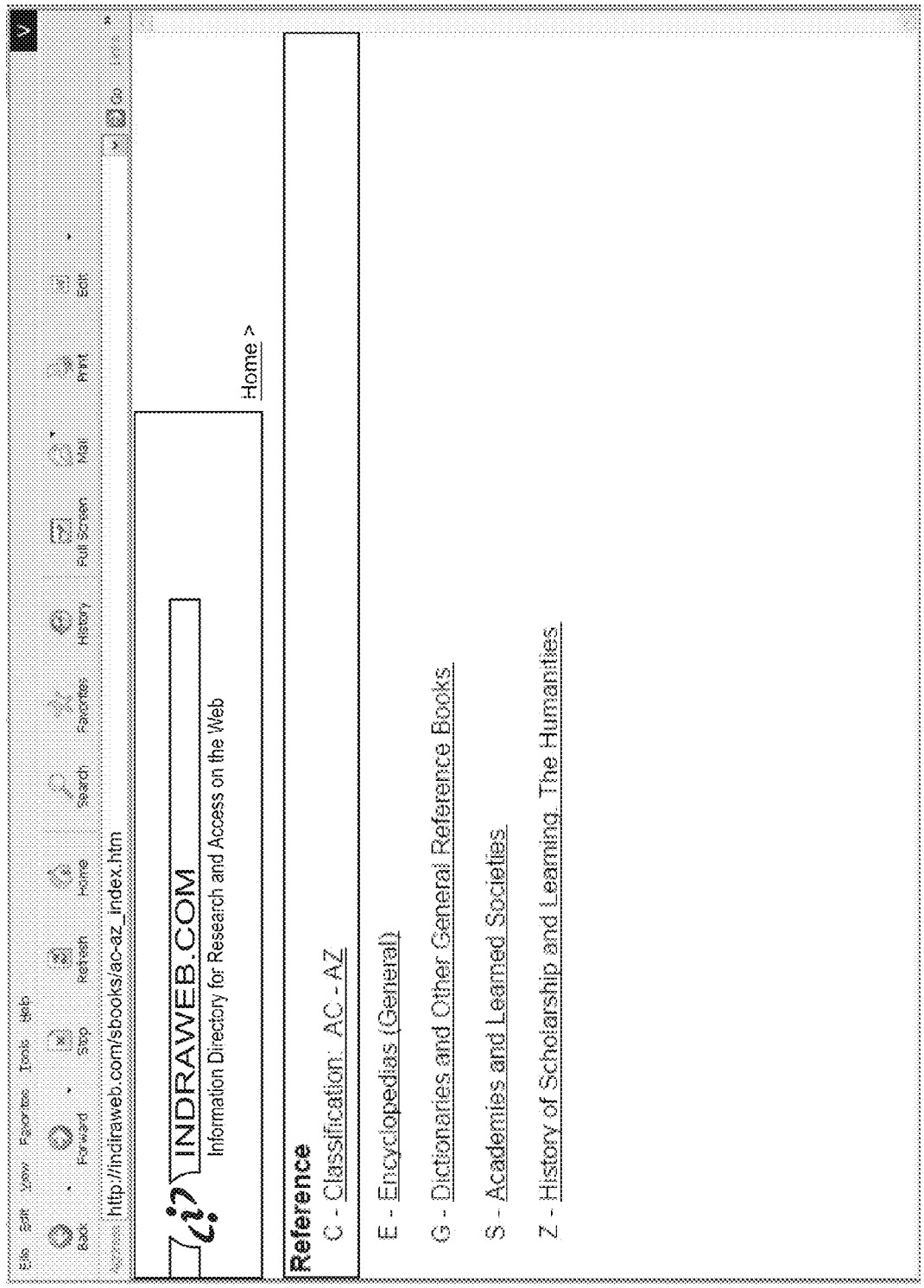
Figure 8:
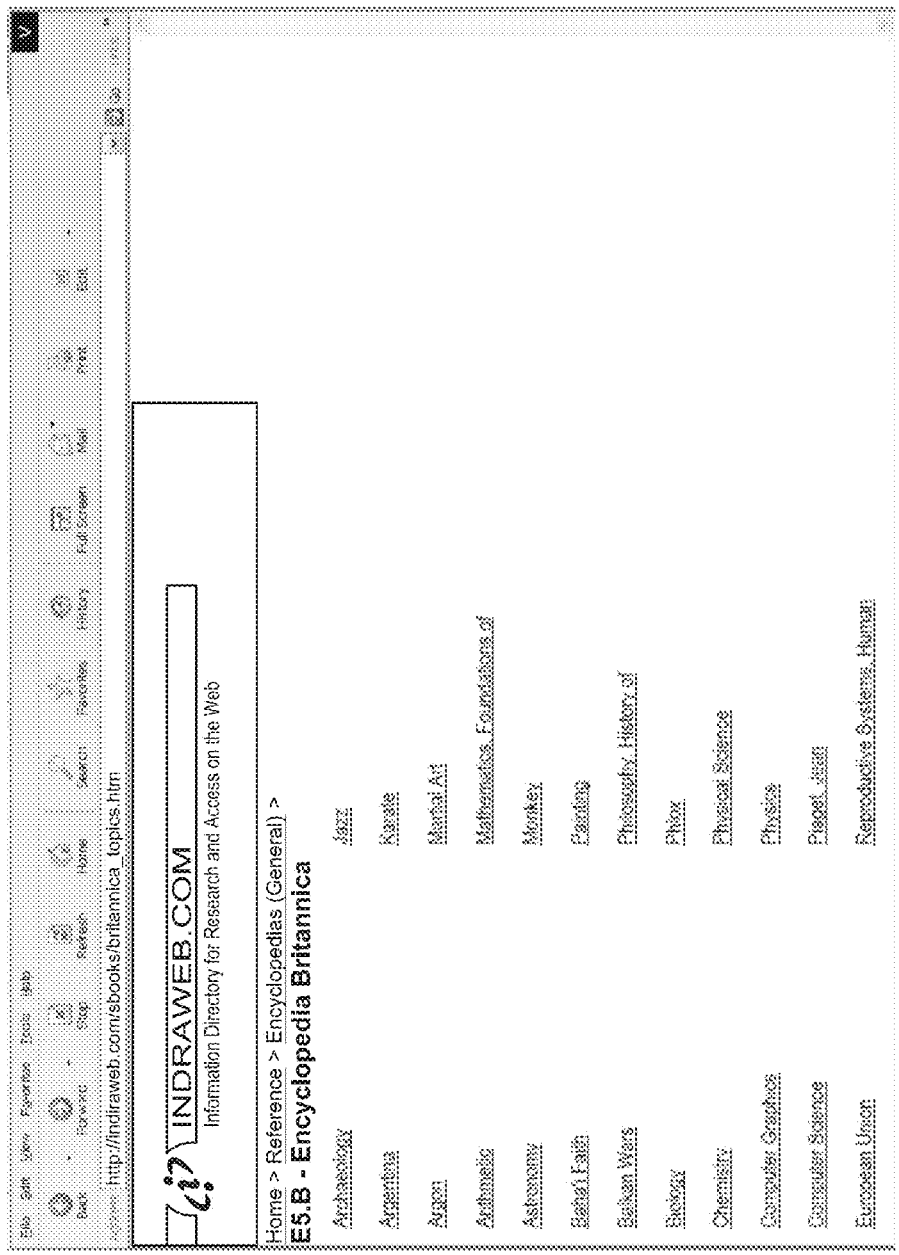
Figure 9:
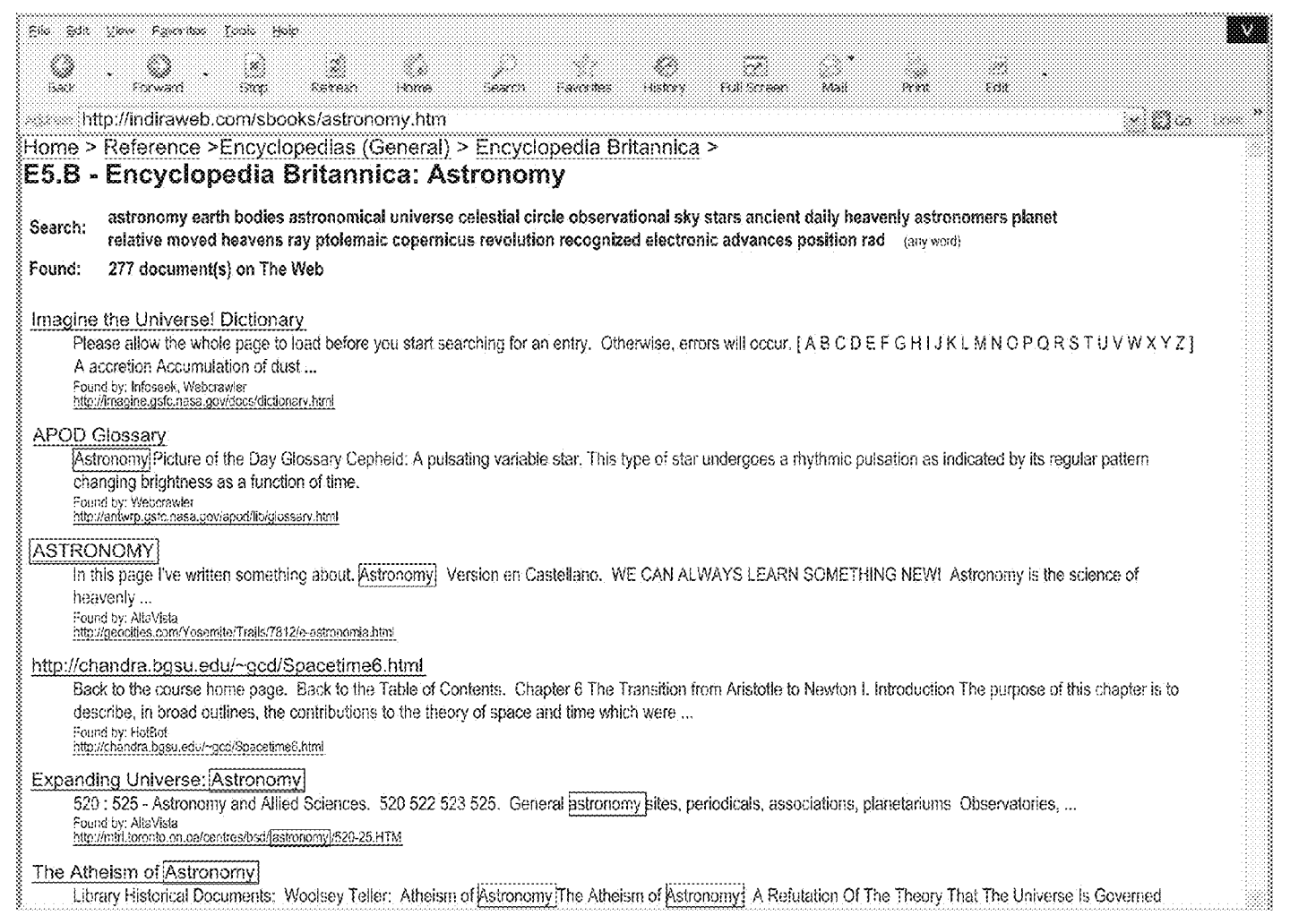

Further embodiment, the systems and methods described herein may be employed for organizing a plurality of corpora into an indexed format that may be presented as a graphical user interface for a user to allow a user to access information related to the contents of a plurality of corpora. For example, FIGS. 5 through 9 depict the operation of a system that processes a plurality of text, such as reference texts. Accordingly, the system may be employed for the automatic creation of a topically organized book catalog, such as a catalog of reference books, with navigation, search, click through to external documents such as web documents, with information purchasing interfaces also. For example, FIG. 5 depicts a graphical user interface that presents to a user a plurality of topics each having a set of books within the topic. For example, the FIG. 5 depicts a topic reference that includes a set of encyclopedias and dictionaries within that reference. By activating the reference link, the user may be presented with the user interface shown in FIG. 6. FIG. 6, the individual references presented under the reference topic of FIG. 5 are outlined for the user allowing the user to select what type of reference the user would like to view.

For example, the user may select from encyclopedias, dictionaries, academic and learned society publications and other such publications. After making a selection FIG. 6, the user may be presented with the different books under each category. The example presented in FIGS. 5 through 9 shows that upon activating the link for encyclopedias, the user is presented with the different encyclopedias that have been processed by the system according to an illustrative embodiment. Upon selecting a link, such as the link for the Encyclopedia Britannica, the user may be presented with the interface shown in FIG. 8 that lists the different topics covered by the Encyclopedia Britannica. At this level, the process now proceeds as described above, with reference to FIGS. 1 through 4 wherein the individual topics maintained within the Encyclopedia Britannica may be employed for accessing contact, such as web contact particularly associated with the individual topics.

In some embodiments, orthogonal corpus indexing (OCI) is employed for selecting ad words for purchase. Advertisers pay search engines for placement of their advertising along side results in search results pages provided by the search engines, when a given word or phrase appears in a user's search query. Such words or phrases are sometimes referred to as ad words. A system employing an OCI database may enable automated selection of related and discriminating terms, identifying keywords that increase the ratio of ads clicked-through to money spent on keyword buying. In addition to selecting positive words that are related to the advertiser and invoke their advertisement, an OCI database may also indicate negative ad words—words with negative correlation to the concept of interest which can be used to prevent an advertisement from being shown. For example, if a user enters a search query such as "apple fruit", an advertiser may desire an advertisement for laptops from Apple Computers® to be prevented from being shown. In such a case, the advertiser may buy "apple" as a positive keyword and "fruit" as a negative ad word related to their advertisement.

Figure 10:
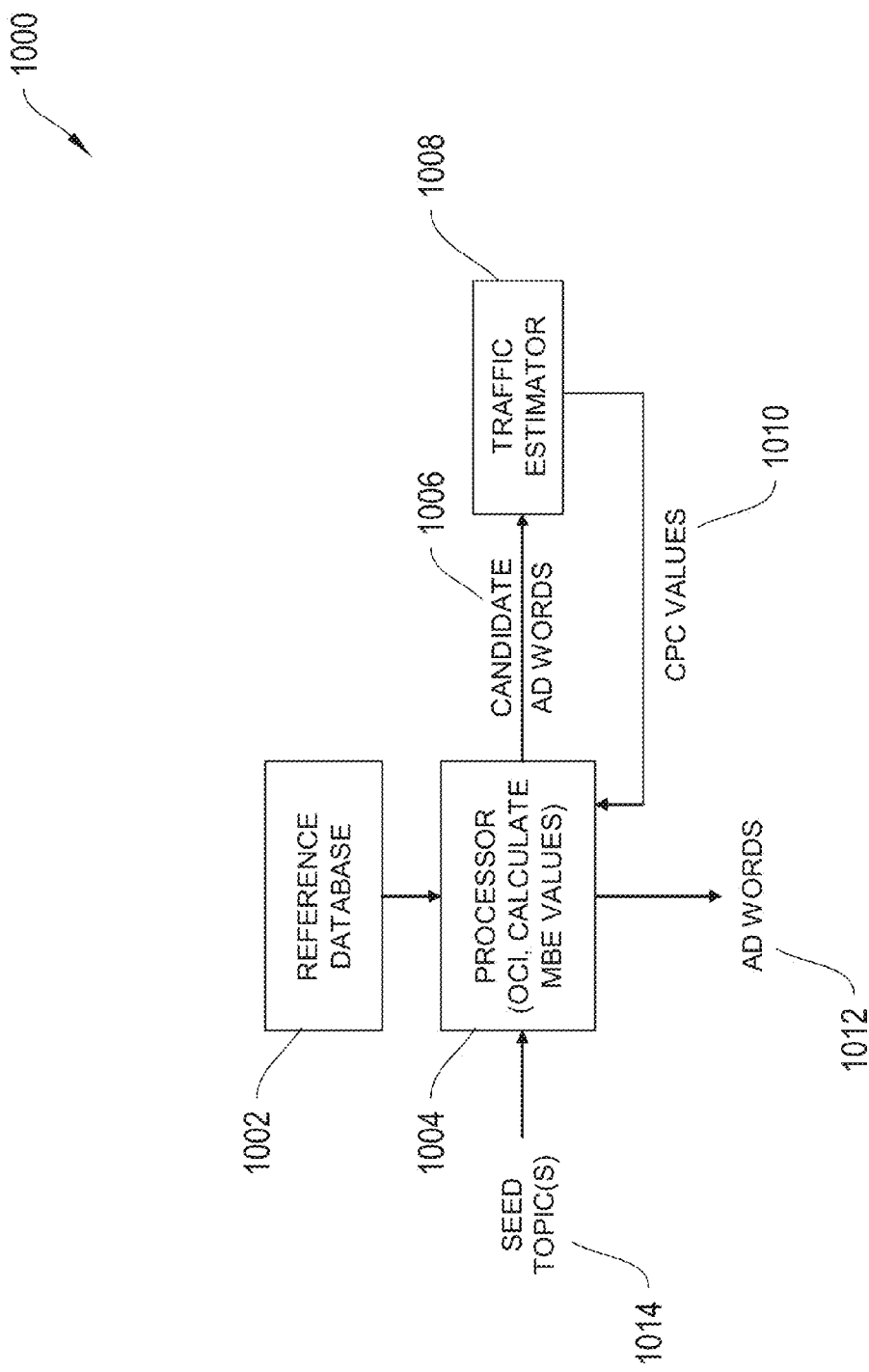
FIG. 10 shows a block diagram for a system that selects ad words for purchase, according to an illustrative embodiment.
Figure 11:
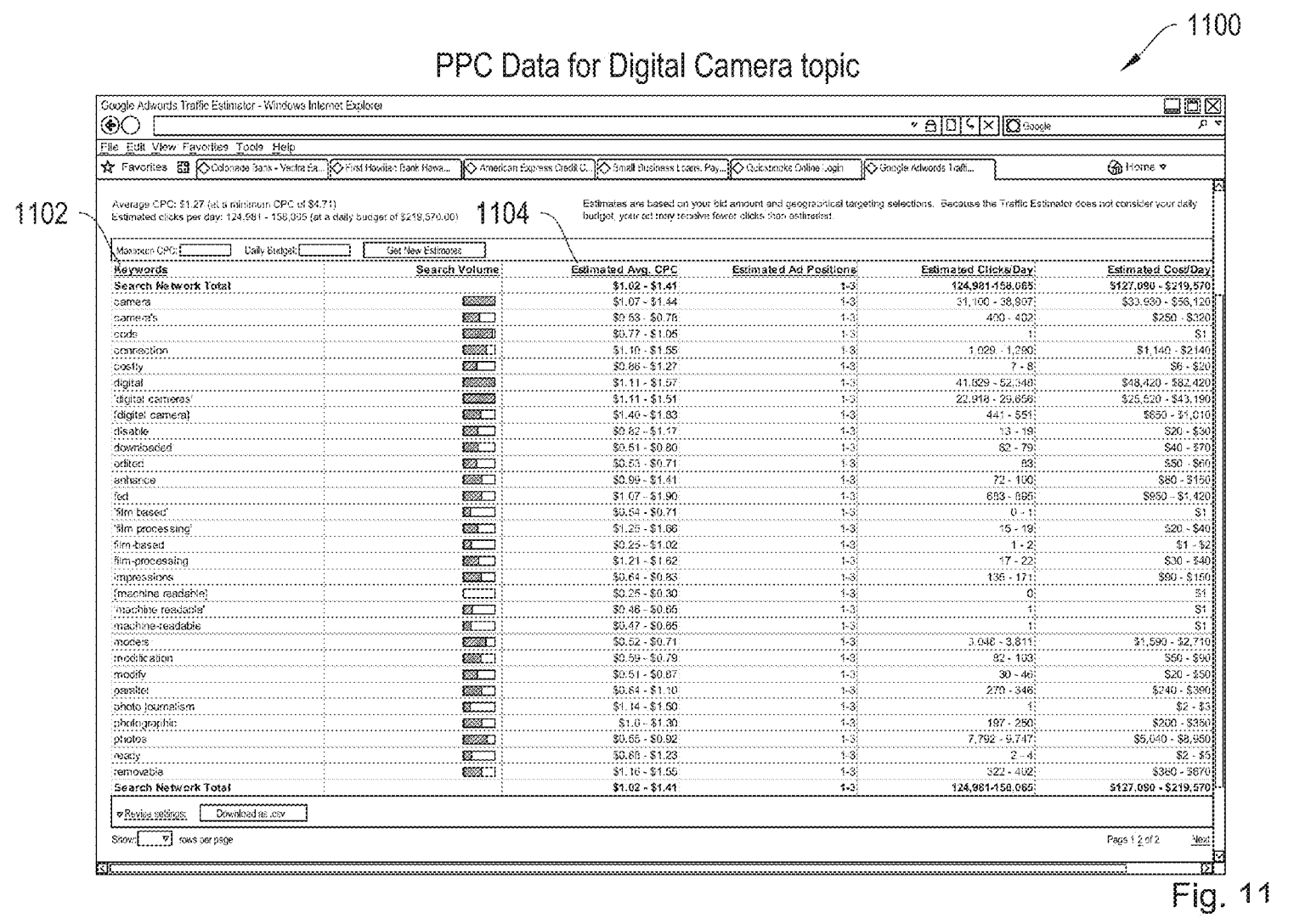

FIG. 10 shows block diagram 1000 for a system that selects ad words for purchase according to an illustrative embodiment. The system includes a reference database 1002 (similar to corpus 114 in FIG. 4) in communication with a processor 1004 (similar to processor 112 in FIG. 4). Processor 1004 processes reference database 1002 using orthogonal corpus indexing (OCI) to derive candidate ad words 1006. Processor 1004 performs the OCI process using one or more seed topics 1014. Seed topics 1014 may be received from a user of the system, or generated by the system itself. For example, the system may determine previously used ad words as seed topics. Processor 1004 queries traffic estimator 1008 for cost per click (CPC) values for each candidate ad word 1006. CPC is the cost paid by an advertiser to search engines for a single click on their advertisement on the respective search engine, which directs one visitor to the advertiser's website. Traffic estimator 1008 provides estimated upper and lower CPC values 1010. An example of a traffic estimator is Google® AdWords® traffic estimator provided by Google, Inc. of Mountain View, Calif., which is a publicly available, keyword traffic analysis tool that helps in gathering data on how much estimated traffic an individual keyword may bring. The estimates may be based on past history for the keywords and other related data. FIG. 11 shows an illustrative output of the Google® AdWords® traffic estimator for ad words 1102 and their estimated CPC values 1104.

Processor 1004 receives estimated upper and lower CPC values 1010 from traffic estimator 1008 and calculates estimated upper and lower marketing break-even (MBE) values as well as an average MBE value for each candidate ad word. An MBE value is calculated as:

MBE=CPC/(conversion rate), where conversion rate is the ratio of visitors who click on an advertisement and perform a desired action, e.g., a purchase, to total visitors who click on the advertisement. For example, if 1000 visitors click on an advertisement for a digital camera, but only 20 visitors make a purchase of a digital camera from the web page linked to by the advertisement, the conversion rate of the advertisement is calculated to be: 20/1000=0.02. In some embodiments, MBE values are computed based on other metrics such as clicks per unit time, conversion rate per click, conversion value, cost per impression, and other suitable metrics. The estimated MBE values represent the volume of desired actions, e.g., a purchase, necessary for the advertisement costs to "break even" or have sales revenue equal to advertising costs. With regard to MBE values, lower is generally more cost-effective for the advertiser. The average MBE value is calculated as:

average MBE=((upper MBE−lower MBE)/2)+lower MBE

Processor 1004 compares the average MBE value for each candidate ad word to a threshold value to determine which ad words to select for purchase. In some embodiments, the threshold value is a global average MBE calculated as the average (or mean) of the average MBE values across all candidate ad words. For example, given two keywords with average MBE values of 4.00 and 5.00, the global average MBE value can be calculated as (4.00+5.00)/2=4.50. Processor 1004 selects ad words having average MBE value below the threshold value to provide ad words 1012 selected for purchase. The threshold value may be input by a user. In some embodiments, the threshold value may be determined by processor 1004 as a function of, e.g., available advertising budget. In some embodiments, the threshold value varies over time and other suitable parameters. In some embodiments, a range for the threshold value may be received, and a value chosen from the range based on time and/or other suitable parameters. In some embodiments, processor 1004 receives actual CPC values for advertisements deployed using the selected ad words. Processor 1004 may calculate respective MBE values for the selected ad words and recommend removal of previously selected ad words that have an average MBE value higher than a threshold value, e.g., the global average MBE. Having an average MBE value higher than global average MBE may indicate that the ad word may not be effective in reaching the advertiser's target audience.

Table VI presents an illustrative analysis of candidate ad words and their respective CPC and MBE values. Table VI shows candidate ad words related to an advertiser for digital cameras. For example, the estimated upper and lower CPC values for "intensity" are $1.12 and $1.40, respectively. These values indicate that cost paid by an advertiser to a search engine for a single click on their advertisement at the search engine varies from $1.12 to $1.40. Table VI assumes a conversion rate of 0.02, i.e., the ratio of visitors who click on the advertisement and perform a desired action, such as a purchase, to total visitors clicking on the advertisement is 0.02. The estimated upper and lower MBE values for "intensity" are $56.00 (=1.12/0.02) and $70.00 (=1.40/0.02), respectively, and the average MBE value is $63 (=((70.00−56.00)/2)+56.00). Given a global MBE average of $80.64 (calculated from average MBE values below) as a threshold value, system 1000 may recommend ad words "matrix metering", "weighting", and "intensity" for purchase. Selecting these ad words may allow for better exposure of the advertisement to consumers interested in digital cameras and in particular, the advertiser's digital cameras, while doing so at an advertising cost lower than costs for commonly-used terms such as "cameras" and "exposure".

TABLE VI

| Keywords | Estimated Cost Per Click (CPC) | | Marketing Cost Breakeven (MBE) | | |
|---|---|---|---|---|---|
| | Lower | Upper | Lower | Upper | Average |
| "matrix metering" | $0.51 | $0.63 | $25.50 | $31.50 | $28.50 |
| weighting | $0.93 | $1.27 | $46.50 | $63.50 | $55.00 |
| intensity | $1.12 | $1.40 | $56.00 | $70.00 | $63.00 |
| cameras | $1.63 | $2.03 | $81.50 | $101.50 | $91.50 |
| finder | $1.52 | $2.29 | $76.00 | $114.50 | $95.25 |
| metering | $1.96 | $2.45 | $98.00 | $122.50 | $110.25 |
| exposure | $2.13 | $2.71 | $106.50 | $135.50 | $121.00 |

(conversion rate = 0.02)

Figure 12A:
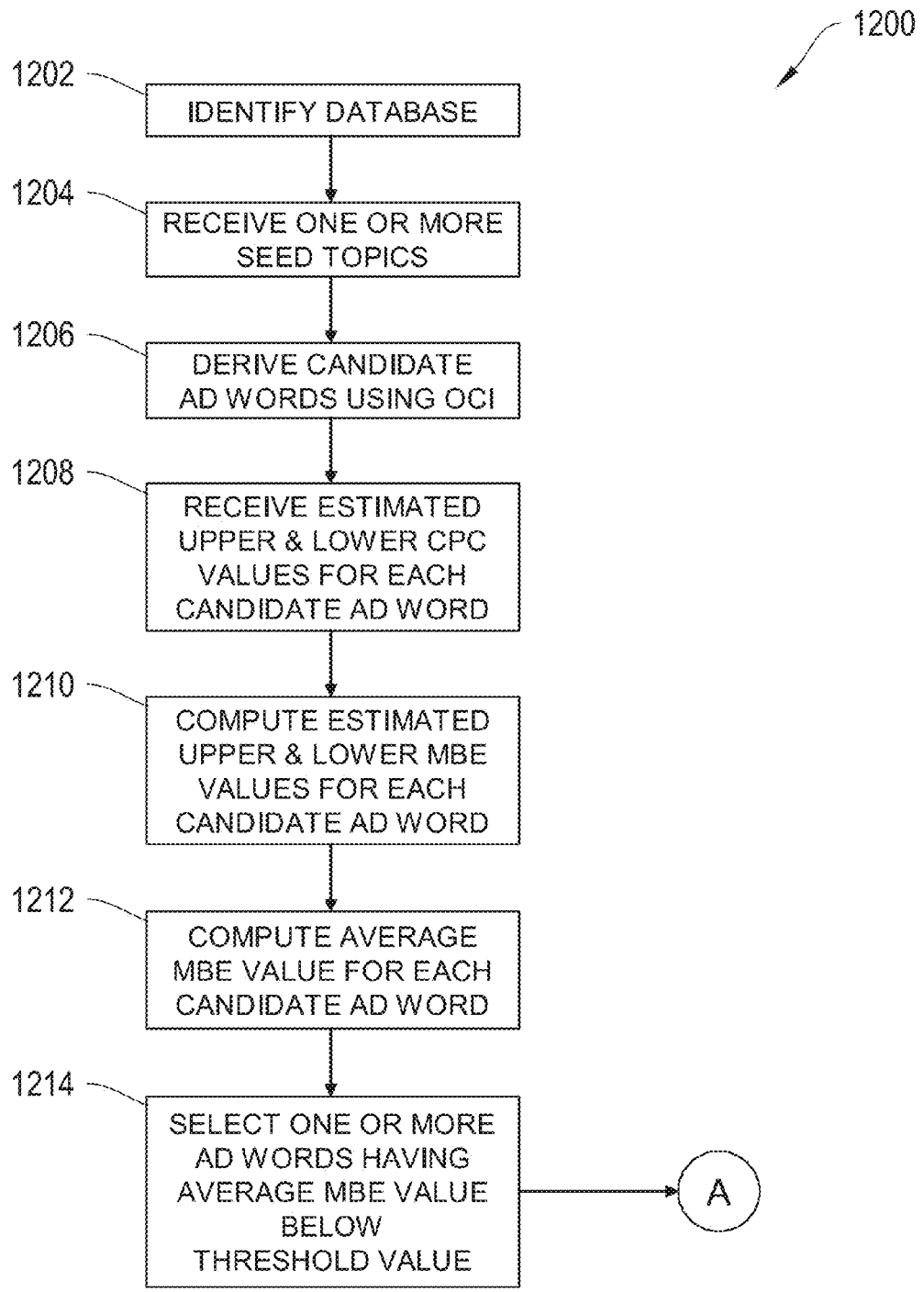
FIGS. 12A and 12B depict flow diagrams for a method of selecting ad words for purchase, according to an illustrative embodiment.
Figure 12B:
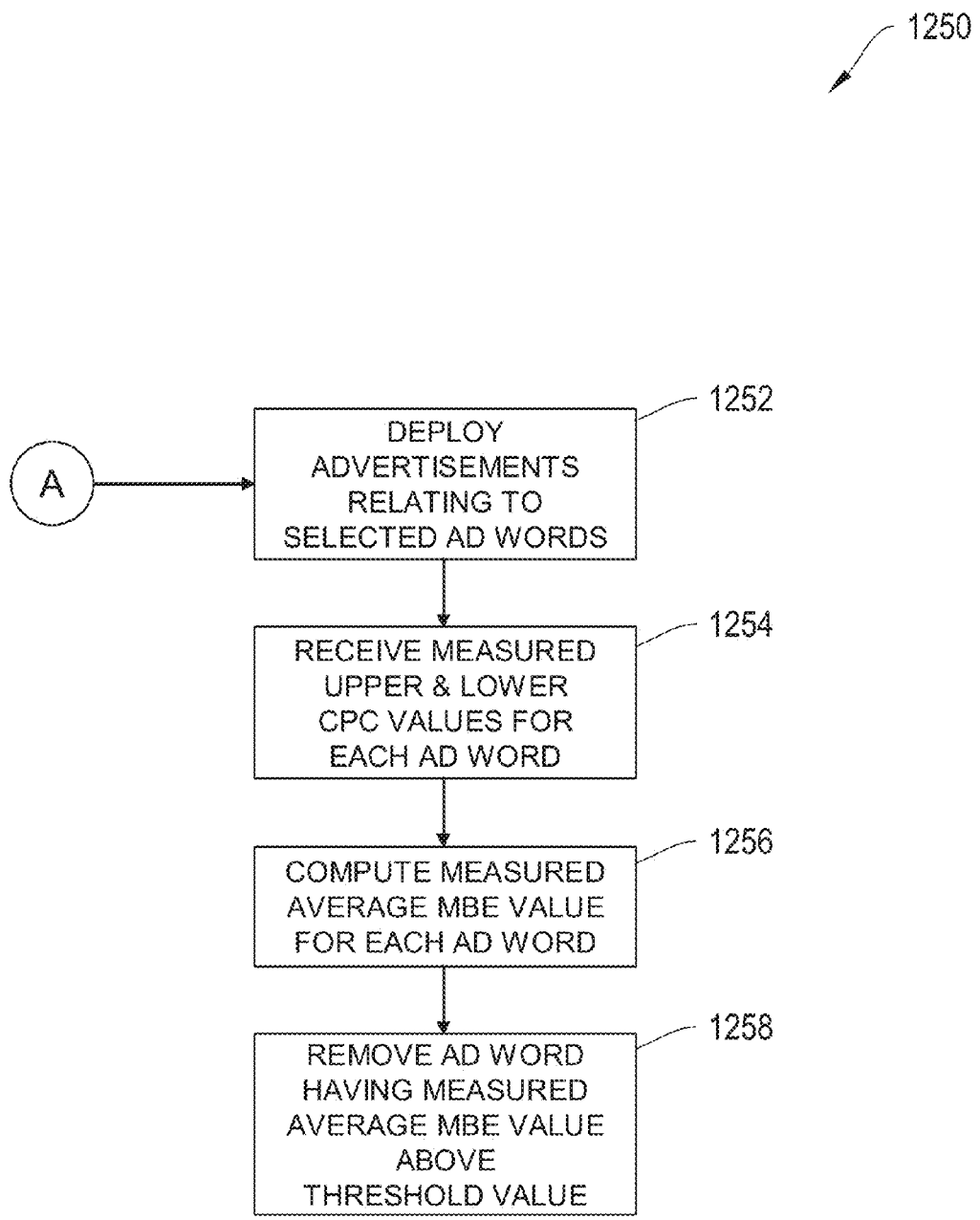

FIGS. 12A and 12B depict flow diagrams 1200 and 1250 for a method of selecting ad words for purchase, according to an illustrative embodiment. At step 1202, a processor (e.g., processor 1004 in FIG. 10) identifies a reference database for processing using OCI. The reference database may include encyclopedias, text and reference books, periodicals, web sites, and other suitable sources. At step 1204, the processor receives one or more seed topics, e.g., "photography", "matrix metering", or any suitable topic relating to advertising for digital cameras. The seed topics may be provided by a user or generated by the system itself. For example, the system may determine previously used ad words as seed topics. At step 1206, the processor derives candidate ad words from the reference database using OCI and related to the seed topics. At step 1208, the processor queries a traffic estimator (e.g., Google® AdWords® traffic estimator provided by Google, Inc. of Mountain View, Calif. or any other suitable traffic estimator), and receives estimated upper and lower cost per click (CPC) values for each candidate ad word. A traffic estimator may profile web pages, advertisements, and other related Internet documents, and gather related information including number of clicks, ad words, advertisers, and other suitable information. The traffic estimator may help determine how much estimated traffic an individual keyword may bring. At step 1212, the processor computes estimated upper and lower marketing break-even (MBE) values and an average MBE value for each candidate ad word. The estimated MBE values represent the volume of desired actions, e.g., a purchase, necessary for the advertisement costs to "break even" or have sales revenue equal to advertising costs. At step 1214, the processor compares the average MBE value for each candidate ad word to a threshold value to determine which ad words to select for purchase. In some embodiments, the threshold value is a global average MBE calculated as the average of the MBE values across all candidate ad words.

Optionally, the processor may receive performance data of advertisements based on the selected ad words and may recommend removal of ad words that are not being cost-effective. At step 1216, advertisements relating to the selected ad words are deployed in an advertising campaign. For example, a digital camera advertising campaign may include selected ad words "matrix metering" and "intensity" and show related advertising in response to a user having these terms in his search engine queries. At step 1218, the processor receives actual CPC values from live performance of advertisements relating to the selected ad words. At step 1220, the processor computes MBE values for the selected ad words and may recommend removal of previously selected ad words that have an average MBE value higher than a threshold value, e.g., the global average MBE. For example, ad word "intensity" may have an average MBE value higher than threshold, indicating that the ad word may not be effective in reaching the advertiser's target audience of users searching for digital cameras. The processor may analyze data related to ad word "intensity" and recommend removal from the selected ad words.

In some embodiments, orthogonal corpus indexing (OCI) is employed for generating an advertiser database, also sometimes referred to as a competitive marketing database. By querying search engines with various advertising keywords, information regarding advertisements shown in response to the keywords can be built into a database. Information in such a database may be organized per advertiser. For example, the database may enable construction of an index of topically organized ad words used in advertisements for a number of advertisers. Fine-grained classification of ad and web content may reveal the topic space in which advertisers buy their ad words. The database may be further augmented by processing the advertiser's web sites and other information such as public filings, products description pages, and annual reports, and inserting this information into the advertiser database. Such an advertising database may facilitate comprehensive analysis of advertisements and related content from competitors, and help an advertiser buy ad words and create advertisements that differentiate themselves from competitor advertisements and are, therefore, more effective and better focused to their target audience.

Figure 13:
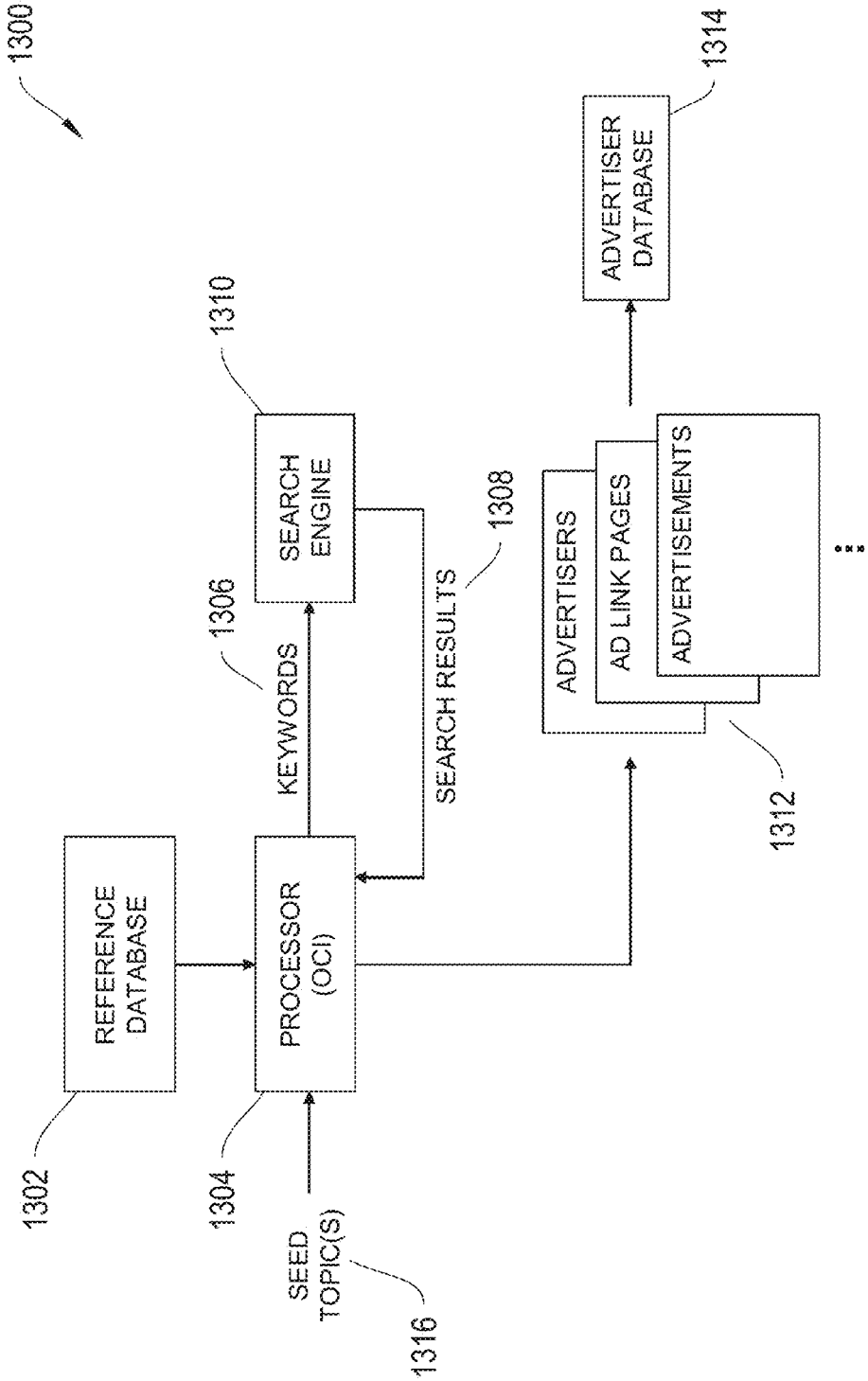
FIG. 13 depicts a block diagram for a system that creates an advertiser database, according to an illustrative embodiment.

FIG. 13 depicts block diagram 1300 for a system that creates an advertiser database according to an illustrative embodiment. The system includes a reference database 1302 in communication with a processor 1304. Processor 1304 processes reference database 1302 using orthogonal corpus indexing (OCI) to derive keywords 1306. Processor 1304 performs the OCI process using one or more seed topics 1316 received from a user of the system, or generated by the system itself Processor 1304 queries a search engine, e.g., Google.com®, Yahoo.com®, or any suitable search engine, with keywords 1306 and processes search results 1308 to identify advertisements in the search results page. Processor 1304 identifies information related to these advertisements into classifications such as advertiser, advertisement content, advertising link page, and ad word. For example, an advertisement for a digital camera may be from Amazon.com®, include content "14 megapixels", link to an Amazon.com product page, and use ad words "camera" and "megapixels". This process is repeated for every keyword in keywords 1306, and the gathered information is inserted into advertising database 1314. Advertising database 1314 may be updated at any time by repeating search queries using keywords 1306.

Figure 14:
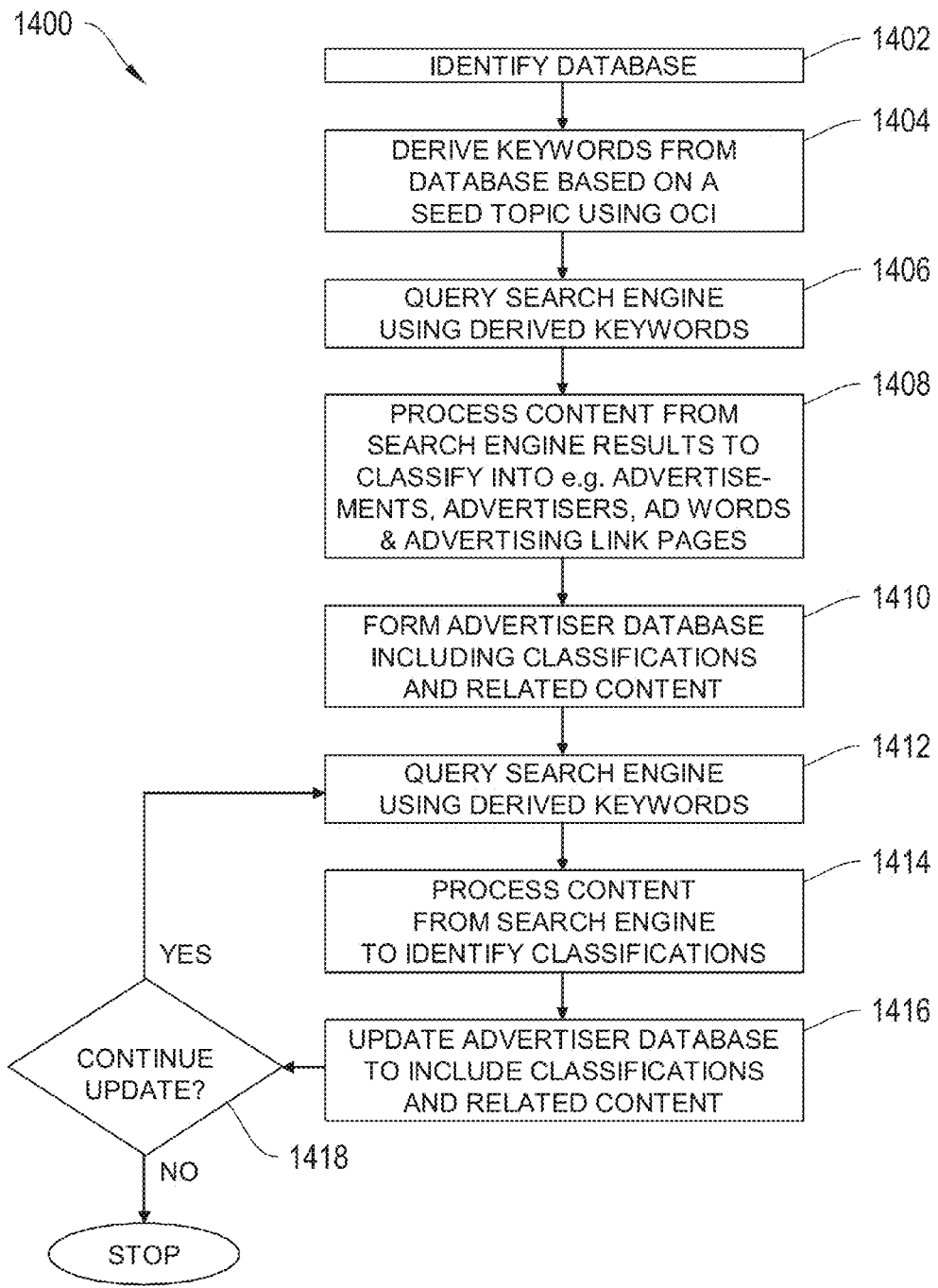
FIG. 14 depicts a flow diagram for a method of creating an advertising database, according to an illustrative embodiment.

FIG. 14 depicts flow diagram 1400 for a method of creating an advertising database, according to an illustrative embodiment. At step 1402, a processor (e.g., processor 1304 in FIG. 13) identifies a reference database for processing using OCI. The reference database may include encyclopedias, text and reference books, periodicals, web sites, and other suitable sources. At step 1204, the processor receives one or more seed topics, e.g., "photography", "matrix metering", or any other suitable topic relating to advertising for digital cameras. The seed topics may be provided by a user or generated by the system itself. The processor derives keywords from the reference database based on the seed topics. At step 1406, the processor queries a search engine, e.g., Google.com®, Yahoo.com®, or any other suitable search engine, with the keywords derived from the reference database. At step 1408, the processor receives search results from the search engine and processes the search results to identify advertisements in the search results page. The processor identifies information related to these advertisements into classifications such as advertiser, advertisement content, advertising link page, and ad word. For example, an advertisement for a florist may be from FTD.com®, include content "dozen roses", link to an FTD.com product page, and use ad words "valentine's" and "gift". At step 1410, the processor inserts the gathered information into an advertising database. If the advertising database does not yet exist, the processor may create the database based on the gathered information.

Optionally, the processor may periodically repeat queries to the search engine based on the keywords and update the advertising database with the latest information. At step 1412, the processor queries the same or another search engine with the keywords or a subset of the keywords derived from the reference database. In some embodiments, the processor may be provided with new keywords to include in its queries to the search engine. At step 1414, the processor receives search results from the search engine and identifies information related to advertisements in the search results page into classifications such as advertiser, advertisement content, advertising link page, and ad word. At step 1416, the processor updates the advertising database with the gathered information. At step 1418, the processor checks to see whether to repeat any of the queries and update the advertising database. If so, the processor proceeds to step 1412 and repeats the process of querying the search engine and updating the database. In some embodiments, new keywords may be added to the search queries or keywords may be removed from the search queries. In some embodiments, the advertising database may be updated periodically, e.g., every hour, every day, or any other suitable interval of time.

FIG. 15 shows an illustrative embodiment of information gathered for the advertising database using the system described with reference to FIGS. 13 and 14. The illustrative embodiment includes topic ID 1502 that may serve as an index into the table shown. The illustrative embodiment further includes ad placement 1504, topic title 1506, stem 1508, and keyword 1510 that relate to an ad word used by an advertiser. Advertising link page 1512 and advertiser information 1514 may provide further information regarding the source of the ad word and contact information for the advertiser. The illustrative embodiment includes such classifications to help organize the gathered information in the advertising database. For example, the first entry indicates that in response to a search query having stem "camera", an advertisement relating to topic title "digital cameras" and using keyword (or ad word) "cameras" was provided in the search results. The advertisement linked to a landing page on Amazon.com and was paid for by Amazon.com, Inc. of Seattle, Wash.

In some embodiments, orthogonal corpus indexing (OCI) is employed in a system for generating content for web pages, advertisements, and/or other suitable Internet documents. The system may generate content for a web page to improve its page rank in a search engine. Building web pages with a higher position (closer to the top of a search result page) is sometimes referred to as SEO (Search Engine Optimization). OCI may be used to determine content from a content database that when added to a web page improves the rank of that page in a search engine. In some embodiments, the system may generate content to form a new web page. Similarly, OCI may be used to determine content for an advertisement to improve its ad rank in a search engine. Analogous to page rank, ad rank determines the relative position of an advertisement in advertising listings displayed by a search engine. In some embodiments, the system may generate content to form a new web page. In some embodiments, OCI may be used to generate keywords to query a search engine for related web pages. The system may extract content from web pages found in response to the search query and add the content to a web page or an advertisement. In some embodiments, the keywords may be provided to a natural language text generator that can synthesize new text to add to the web page or advertisement.

Figure 16:
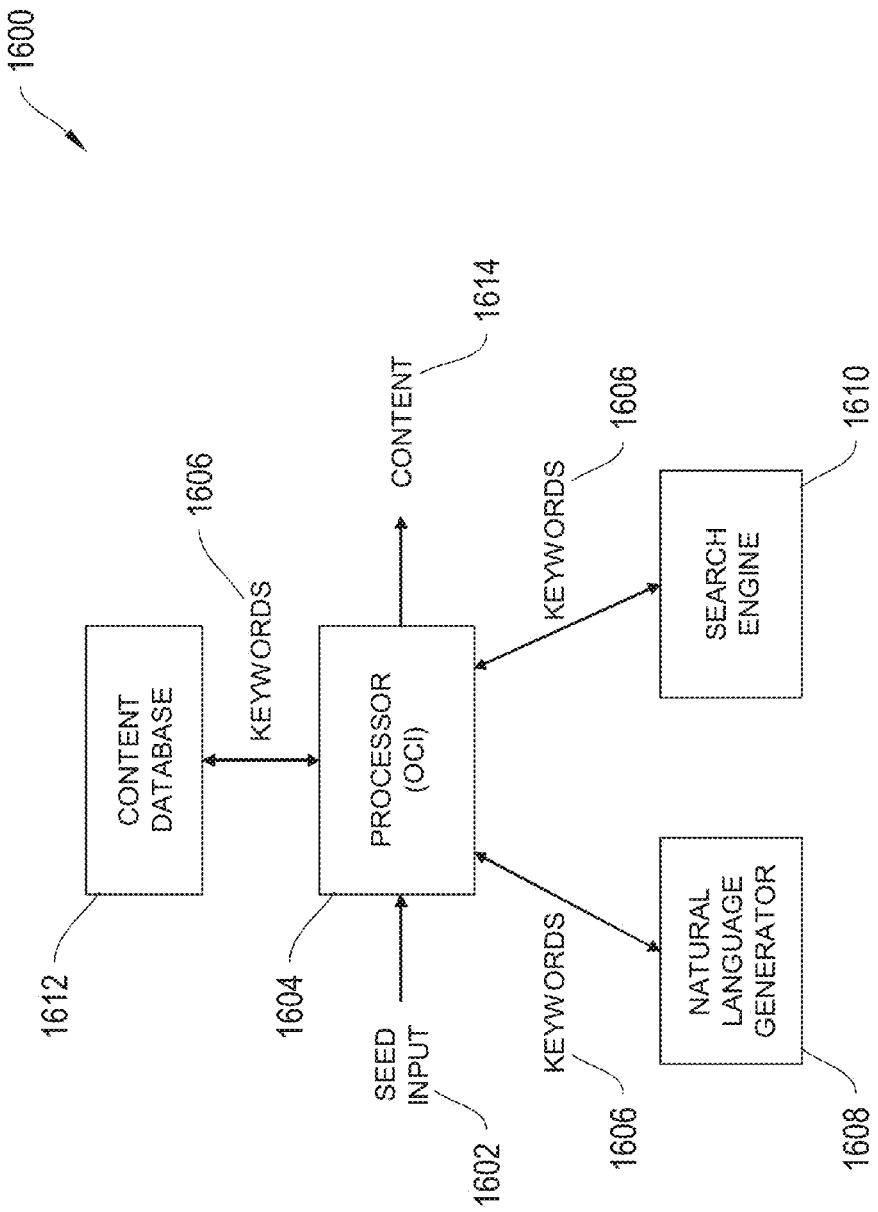
FIG. 16 depicts a block diagram for a system that generates content to add to a web page or an advertisement.

FIG. 16 depicts block diagram 1600 for a system that generates content to create a web page or an advertisement or to add to an existing web page or advertisement. The following description is provided primarily with reference to content for a web page, but may be considered applicable to content for an advertisement or any other suitable Internet document. The system includes a content database 1612 in communication with a processor 1604. Processor 1604 processes content database 1612 using orthogonal corpus indexing (OCI) to derive keywords relating to content in the database. Processor 1604 receives seed input 1602 and processes the seed input to determine one or more keywords 1606 relating to the content. In some embodiments, seed input 1602 includes a web page. For example, the web page may be for an organization that sells CDMA mobile phones, and processor 1604 may determine keywords such as "cellular" and "CDMA" relating to the content of the web page. In some embodiments, seed input 1602 includes a seed topic, such as digital cameras, that may be processed by processor 1604 to determine keywords 1606. In some embodiments, seed input 1602 includes both a web page and a seed topic and determines keywords 1606 based on one or both. In some embodiments, seed input 1602 includes an advertisement and/or a seed topic, and determines keywords 1606 based on one or both. Processor 1604 queries content database 1612 for content based on keywords 1606. Content database 1612 may output certain content which may be added to web page 1602 or be used to form an entirely new web page. For example, content database 1612 may output text including advantages of CMDA technology over GSM technology, which may be added to web page 1602 since its content relates to CMDA mobile phones. Addition of such relevant and/or unique content may enhance the web page and help improve the page rank of web page 1602. Similarly, when the system is applied to generate content for an advertisement, addition of such content may improve the number of clicks and ad rank within a search engine for the advertisement. In some embodiments, the generated content may be used to form a new web page or a new advertisement, different from the web page or advertisement received in seed input 1602. Further details on methods relating to adding content to web pages and advertisements are provided with reference to FIG. 17 below.

In some embodiments, in addition to querying content database 1612, processor 1604 queries search engine 1610 with keywords 1606 to determine content. Search engine 1610 may provide related web pages in response to a search query having one or more of keywords 1606. Processor 1604 may extract content from one or more related web pages and add the content to web page 1602. In some embodiments, processor 1604 queries natural language text generator 1608 using keywords 1606 to request synthesis of new text to add to web page 1602. In some embodiments, processor 1604 determines categories of keywords 1606 selected from the group of a noun, a verb, a place, a person, and an other part of speech, and queries natural language text generator 1608 using keywords 1606 and their respective categories. Natural language generation is directed to synthesis of new text having natural language in the form of sentences and paragraphs. For example, weather forecast periodically provided by The Weather Channel® is synthesized by a natural language generator from raw weather sensor data. Natural language generators greatly benefit from a context to restrict their scope, which is readily provided by keywords 1606. This reduces the scope of processing, making natural language generation a tractable task and likely to produce meaningful and relevant output. Natural language generator 1608 may include a commercially available natural language generator, e.g., KPML natural language generator developed by University of Bremen, Germany. Further examples and details on natural language generators may be found in *Building natural language generation systems*, Cambridge University Press (2000), the teachings of which book are herein incorporated by reference in their entirety. In some embodiments, the generated content may be used to form a new web page or a new advertisement, different from the web page or advertisement received in seed input 1602.

Figure 17:
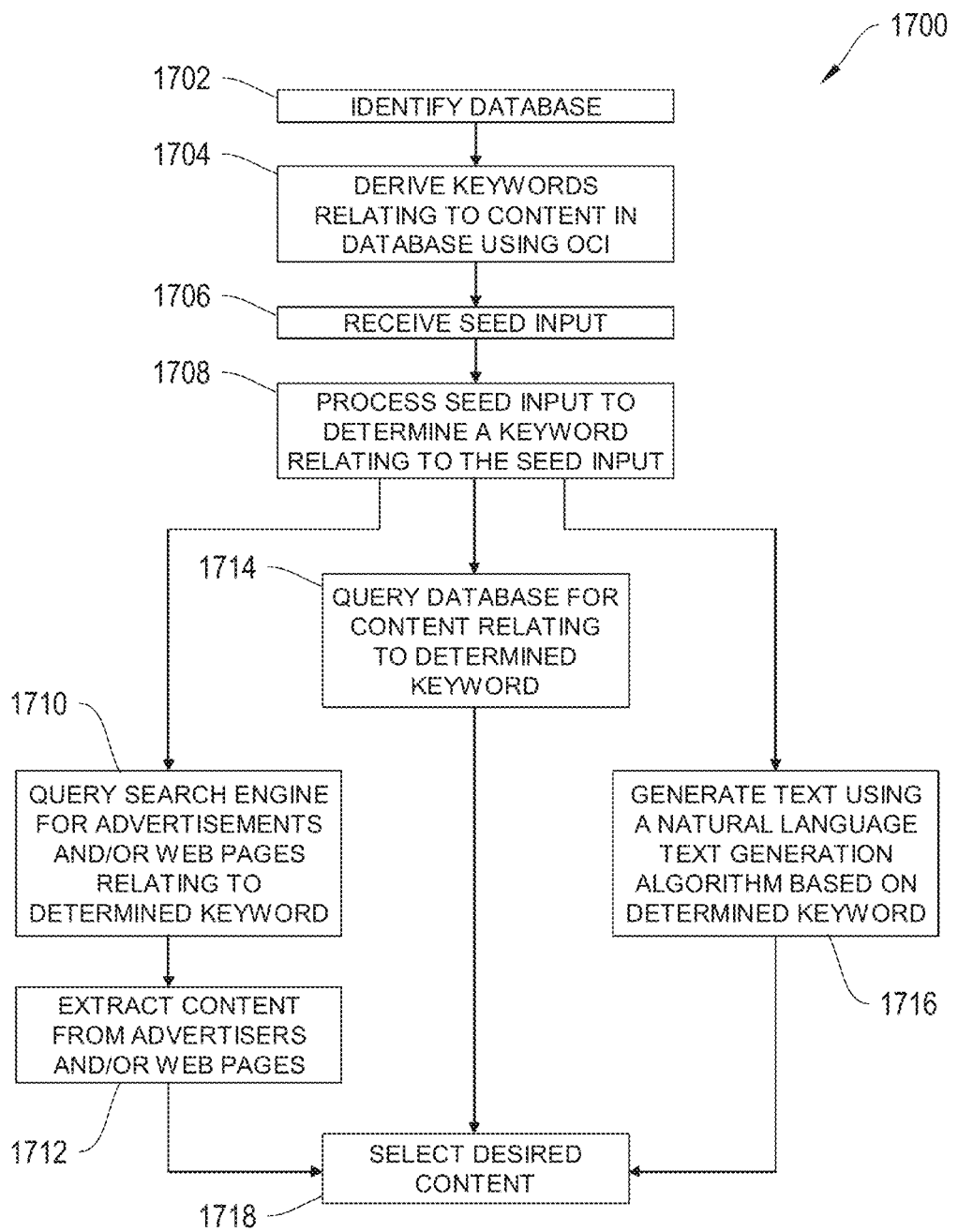
FIG. 17 depicts a flow diagram for a method of generating content for improving ranking in a search engine of a web page, according to an illustrative embodiment.

FIG. 17 depicts flow diagram 1700 for a method of generating content to create a web page or an advertisement or to add to an existing web page or advertisement, according to an illustrative embodiment. At step 1702, a processor (e.g., processor 1604 in FIG. 16) identifies a content database for processing using OCI. The reference database may include encyclopedias, text and reference books, periodicals, web sites, and other suitable sources. At step 1704, the processor processes the content database using orthogonal corpus indexing (OCI) to derive keywords relating to content in the database. At step 1706, the processor receives a seed input. The seed input may include one or more of a web page, an advertisement, an ad word, and a seed topic. In some embodiments, the seed input may include a web page that needs to improve its page rank. In some embodiments, the seed input may include an advertisement that needs to improve its ad rank. At step 1708, the processor analyzes the seed input to determine one or more keywords relating to the content, e.g., the processor may analyze a seed input including a web page that sells CDMA mobile phones to determine keywords "cellular" and "CDMA" relating to the web page. In another example, the processor may analyze a seed input including ad word "digital camera" to determine keywords "photography" and "megapixels" relating to the ad word. At steps 1710, 1712/1714, and 1716, the processor attempts to retrieve content from various sources based on the keywords. For example, at step 1710, the processor queries the content database for content based on the keywords, such as "cellular" and "CDMA". At step 1712, the processor queries a search engine with the keywords. At step 1714, the processor extracts content from related web pages provided in response to the search query having the keywords. At step 1716, the processor queries a natural language text generator using the keywords to request synthesis of new text. At step 1718, the processor receives content from the content database, the search engine, and the natural language generator, and selects which content is desired. In some embodiments, the selected content may be added to a web page and addition of such relevant and/or unique content may help improve the page rank of the web page. In some embodiments, the selected content may be added to an advertisement and addition of the content may help improve the ad rank of the advertisement in a search engine as well as number of clicks to the advertisement from users of the search engine. In some embodiments, an entirely new web page and/or advertisement may be created using the selected content.

Those skilled in the art will know or be able to ascertain using no more than routine experimentation, many equivalents to the embodiments and practices described herein. For example, the systems and methods described herein may be employed for providing encyclopedia (i.e., corpus) extender. An encyclopedia (as an archetype example of an orthogonal corpus) may be automatically extended by application of the systems and methods described above, to include links into the World Wide Web, or other database, via searching or meta-searching over the Web. The breadth and depth of the corpus enables a high quality, high coverage database of web links, with the web links organized according to the location in the topic hierarchy whose text was used to generate them. Such links may provide geographical maps, histories of topics of interest, access to theses and other types of information. Other applications include web book companions wherein the system processes a book, including a fictional work, a non-fictional work, or a reference book, through this system will allow automated construction of topical web sites as Web Companions to individual books. For example, a book such as *The Hunt for Red October* may be processed by the systems described herein to create links into the Web to documents associated with concepts from the book, such as links to the Navy Submarine division, links to topographic maps of the ocean floor, links to Russian Naval History, and other similar links.

A search engine extension may be provided by accessing the database 108 through the API. Thus a user may do a search on a web search engine, they may want to refine their search or get a second search opinion. Given a broad topic database such as that created in the Encyclopedia Extender application described above, refinement of a user's intended topic is enabled—through keyword-based narrowing, web link browsing, and display of proximal or correlated topics in the corpus topic hierarchy. For e-commerce, the systems described herein book/article browser/seller. Browsing over the topic hierarchy may provide indexes into books or articles for sale.

Additional applications can include a user interface. The user interface allows users to view Web links through the topic hierarchies defined by the corpus. The topic hierarchy on the left lists the topics as per the corpus. The user may select keywords from the corpus outline, or from provided sample text inside the corpus documents, to better focus and score the topic. Users may augment the search terms or keywords with their own keywords or selected synonyms to more specifically tailor a concept to a need. Searching across the corpus or across the referenced links may include synonyms, stemming, frequency, proximity, stop words, hyponyms, and synonyms.

Additionally, authoring toolkits may be provided that allow publishers, editors, and authors to create corpus extensions and associated applications. For example, the systems and methods described herein may be employed to create development kits that publishers may use to index a book and create a web site that acts as the book companion described above.

It may be noted that human oversight or auditing of the document scoring and database may be done in order to augment the purely automated document selection. This may be done on a sampling basis for quality control. Different levels of sensitivity to content or product price points may be implied by different levels of human quality control. Moreover, it will be noted that the system described above has been done so with reference to documents stored on the Web. However, it will be understood by those of ordinary skill in the art, that the Web is being used here as a metaphor for any electronic document archive, and the systems and methods described herein are not limited to the Web.

Variations, modifications, and other implementations of what is described may be employed without departing from the spirit and scope of the disclosure. More specifically, any of the method and system features described above or incorporated by reference may be combined with any other suitable method, system, or device feature disclosed herein or incorporated by reference, and is within the scope of the contemplated systems and methods described herein. The systems and methods may be embodied in other specific forms without departing from the spirit or essential characteristics thereof. The foregoing embodiments are therefore to be considered in all respects illustrative, rather than limiting of the systems and methods described herein. The teachings of all references cited herein are hereby incorporated by reference in their entirety.

Accordingly, it will be understood that the systems and methods described herein are not to be limited to the embodiments disclosed herein, that other applications, such as information mining may be practiced with the systems and methods described herein, and that the systems and methods described herein are to be understood by the following claims which are to be interpreted as broadly as allowed under the law.

The invention claimed is:

1. A computerized method for inserting information into an advertising database, comprising
processing, by a processor, an information database using orthogonal corpus indexing and a seed topic to derive a plurality of keywords, wherein the information database includes a first plurality of documents associated with the seed topic and a second plurality of documents associated with other topics, wherein the orthogonal corpus indexing processes the information database to derive the plurality of keywords, and wherein the plurality of keywords distinguishes the first plurality of documents from the second plurality of documents;
sending, from the processor, a first query to a search engine, wherein the first query includes a first keyword from the plurality of keywords;
processing, by the processor, a first results page to determine content relating to a classification selected from a group of classifications, the group of classifications including an advertiser, an advertisement, an ad word, and an advertising link page, the first results page being provided by the search engine in response to the first query having the first keyword; and
inserting, by the processor, the determined content in the advertising database based on the classification of the determined content.

2. The method of claim 1, comprising
receiving a web page having at least one of an advertisement, an ad word, a public filing, and a product description relating to an advertiser;
processing, by the processor, the received web page to determine content and respective classification; and
inserting the determined content with respective classification in the advertising database.

3. The method of claim 1, wherein the information database includes at least one of an encyclopedia, a text book, a reference book, a periodical, and a web site.

4. The method of claim 1, wherein the seed topic is received from a user.

5. The method of claim 1, wherein the seed topic is generated automatically.

6. The method of claim 1, wherein inserting the determined content with respective classification into the advertising database comprises:
determining that the advertising database does not yet exist; and
creating the advertising database based on the determined content.

7. The method of claim 1, comprising sending one or more additional queries to the search engine based on the plurality of keywords.

8. The method of claim 7, wherein the one or more additional queries include a keyword other than the first keyword.

9. The method of claim 7, comprising
processing one or more additional results pages provided by the search engine in response to the one or more additional queries to determine additional content relating to a classification selected from the group of classifications; and
updating the advertising database with the additional content based on the classification of the additional content.

10. The method of claim 9, wherein an additional query is sent according to one of an hourly interval, a daily interval, and a user selected time interval.

11. A system for creating an advertising database comprising:
a processor configured to:
receive information from an information database and process the information using orthogonal corpus indexing and a seed topic to derive a plurality of keywords, wherein the information database includes a first plurality of documents associated with the seed topic and a second plurality of documents associated with other topics, wherein the orthogonal corpus indexing processes the information database to derive the plurality of keywords, and wherein the plurality of keywords distinguishes the first plurality of documents from the second plurality of documents;
send a first query to a search engine, wherein the first query includes a first keyword from the plurality of keywords;
receive a first results page and process the first results page to determine content relating to a classification selected from a group of classifications, the group including an advertiser, an advertisement, an ad word, and an advertising link page, the first results page being received from the search engine in response to the first query having the first keyword; and
insert the determined content in the advertising database based on the classification of the determined content.

12. The system of claim 11, wherein the processor is further configured to:
receive a web page having at least one of an advertisement, an ad word, a public filing, and a product description relating to an advertiser;
process the received web page to determine content and respective classification; and
insert the determined content with respective classification in the advertising database.

13. The system of claim 11, wherein the information database includes at least one of an encyclopedia, a text book, a reference book, a periodical, and a web site.

14. The system of claim 11, wherein the seed topic is received from a user.

15. The system of claim 11, wherein the seed topic is generated automatically.

16. The system of claim 11, wherein the processor is further configured to determine that the advertising database does not yet exist; and
create the advertising database based on the determined content.

17. The system of claim 11, wherein the processor is further configured to send one or more additional queries to the search engine based on the plurality of keywords.

18. The system of claim 17, wherein the one or more additional queries include a keyword other than the first keyword.

19. The system of claim 17, wherein the processor is further configured to
process one or more additional results pages provided by the search engine in response to the one or more additional queries to determine additional content relating to a classification selected from the group of classifications; and
update the advertising database with the additional content based on the classification of the additional content.

20. The system of claim 19, wherein an additional query is sent according to one of an hourly interval, a daily interval, and a user selected time interval.

\* \* \* \* \*